(12) United States Patent
Aoki et al.

(10) Patent No.: US 8,199,101 B2
(45) Date of Patent: Jun. 12, 2012

(54) TRANSMISSION LIQUID CRYSTAL DISPLAY DEVICE

(75) Inventors: Atsushi Aoki, Nara (JP); Tsuyoshi Muramatsu, Nara (JP); Takashi Morisue, Nara (JP); Hiroshi Tanaka, Soraku-gun (JP); Manabu Yumoto, Nara (JP); Masayuki Ehiro, Izumi (JP)

(73) Assignee: Sharp Kabushiki Kaisha, Osaka (JP)

( * ) Notice: Subject to any disclaimer, the term of this patent is extended or adjusted under 35 U.S.C. 154(b) by 1258 days.

(21) Appl. No.: 11/933,559

(22) Filed: Nov. 1, 2007

(65) Prior Publication Data

US 2008/0180384 A1 Jul. 31, 2008

(30) Foreign Application Priority Data

Nov. 6, 2006 (JP) ................................. 2006-300845
Jan. 17, 2007 (JP) ................................. 2007-008457

(51) Int. Cl.
*G09G 3/36* (2006.01)
(52) U.S. Cl. ............. 345/102; 345/88; 345/89; 345/690
(58) Field of Classification Search .................. 345/102, 345/88–89, 690
See application file for complete search history.

(56) References Cited

U.S. PATENT DOCUMENTS

| 6,961,038 B2 * | 11/2005 | Yoshinaga et al. .............. 345/88 |
| 7,277,075 B1 | 10/2007 | Hirano et al. |
| 7,656,375 B2 * | 2/2010 | Lo et al. .......................... 345/88 |
| 2004/0046725 A1 | 3/2004 | Lee |
| 2005/0140622 A1 * | 6/2005 | Lee et al. ........................ 345/88 |
| 2008/0084524 A1 | 4/2008 | Inuzuka et al. |
| 2008/0165103 A1 | 7/2008 | Lee |
| 2009/0002298 A1 | 1/2009 | Furukawa |

FOREIGN PATENT DOCUMENTS

| JP | 11-065531 | 3/1999 |
| JP | 2001-147666 A | 5/2001 |
| JP | 3450842 B2 | 7/2003 |
| JP | 2004-102292 A | 4/2004 |
| JP | 2005-196175 A | 7/2005 |
| JP | 2007-3848 A | 1/2007 |
| JP | 2008-96548 A | 4/2008 |
| WO | 2006/080237 A1 | 8/2006 |

\* cited by examiner

*Primary Examiner* — Nitin Patel
*Assistant Examiner* — Leonid Shapiro
(74) *Attorney, Agent, or Firm* — Nixon & Vanderhye P.C.

(57) ABSTRACT

The transmission liquid crystal display device includes a liquid crystal panel and a backlight, wherein the liquid crystal panel has pixels each of which is divided into four sub pixels as red (R), green (G), blue (B), and white (W) sub pixels. Further, an emission luminance of the backlight can be controlled.

3 Claims, 15 Drawing Sheets

FIG. 5 (a)

INPUT SIGNALS (Ri, Gi, Bi)

| A: (200, 200, 190) | B: (180, 100, 80) |
|---|---|
| C: (130, 150, 70) | D: (100, 120, 80) |

FIG. 5 (b)

TRANSMISSION QUANTITIES (Rqi, Gqi, Bqi, Wqi)

| A: (100, 100, 90, 100) | B: (100, 20, 0, 80) |
|---|---|
| C: (60, 80, 0, 70) | D: (40, 60, 20, 60) |

FIG. 5 (c)

BACKLIGHT VALUES OF PIXELS

| A: 100 | B: 100 |
|---|---|
| C: 80 | D: 60 |

⇒ BACKLIGHT VALUE: 100

FIG. 5 (d)

TRANSMITTANCES (Rpi, Gpi, Bpi, Wpi)

| A: (1.0, 1.0, 0.9, 1.0) | B: (0.1, 0.2, 0.0, 0.8) |
|---|---|
| C: (0.6, 0.8, 0.0, 0.7) | D: (0.4, 0.6, 0.2, 0.6) |

FIG. 5 (e)

DISPLAY LUMINANCES

| A: (200, 200, 190) | B: (180, 100, 80) |
|---|---|
| C: (130, 150, 70) | D: (100, 120, 80) |

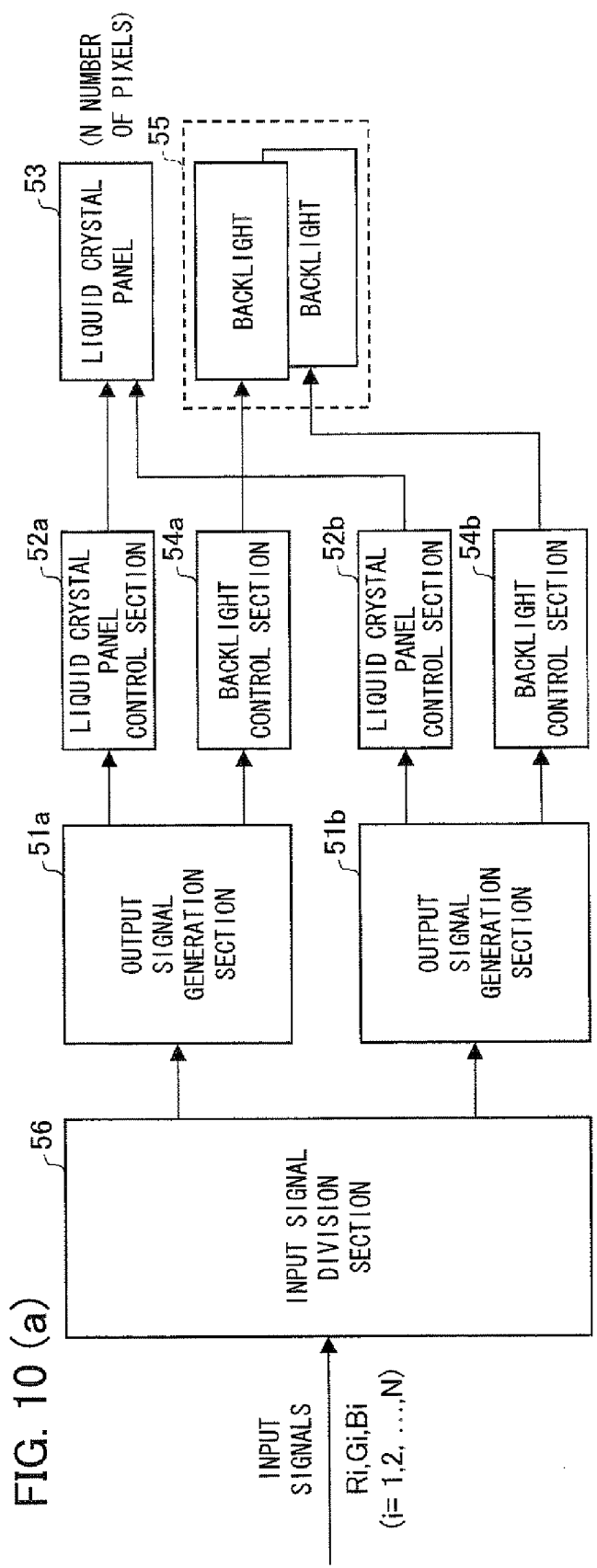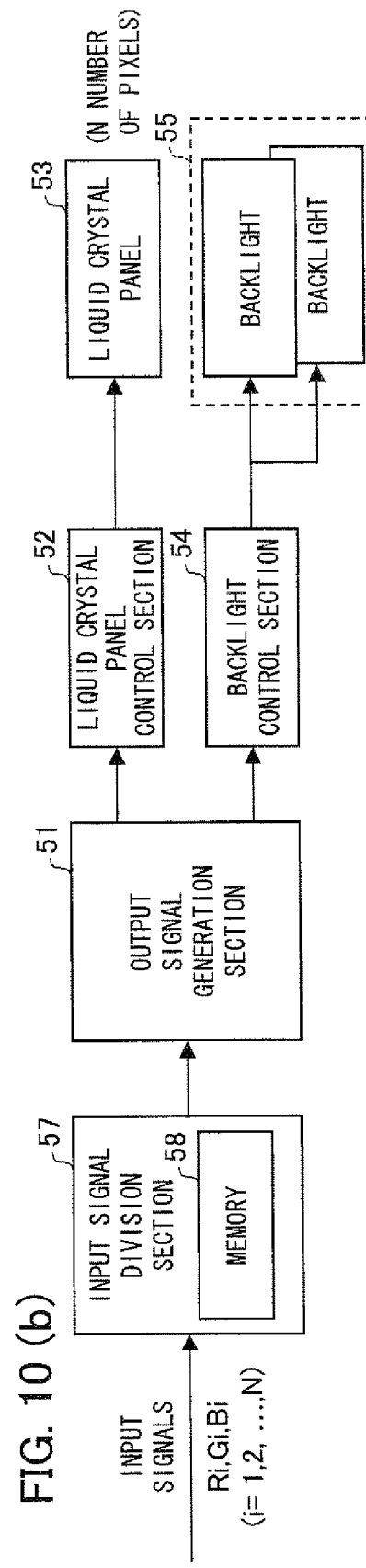
FIG. 10 (a)
FIG. 10 (b)

FIG. 13 (a)   PRIOR ART
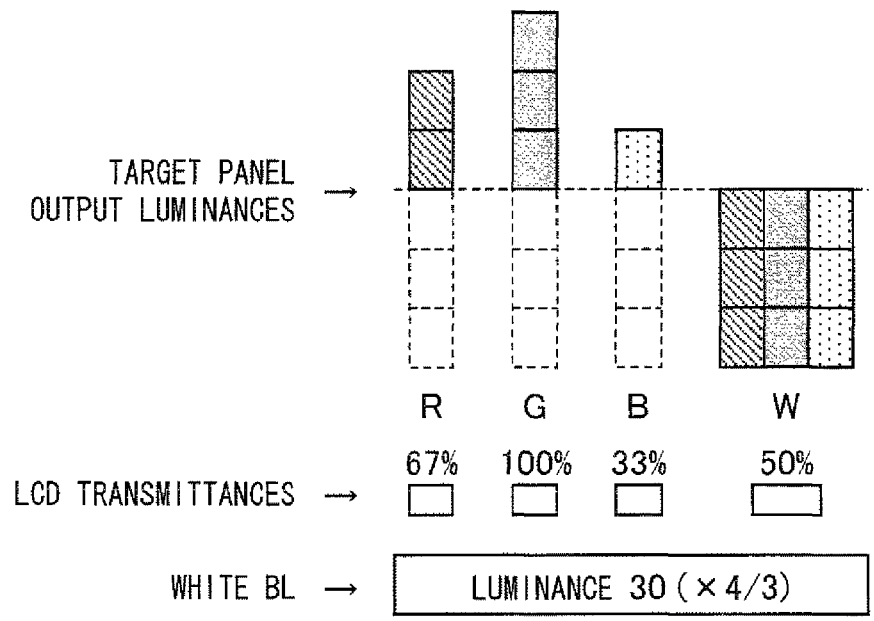
FIG. 13 (b)   PRIOR ART
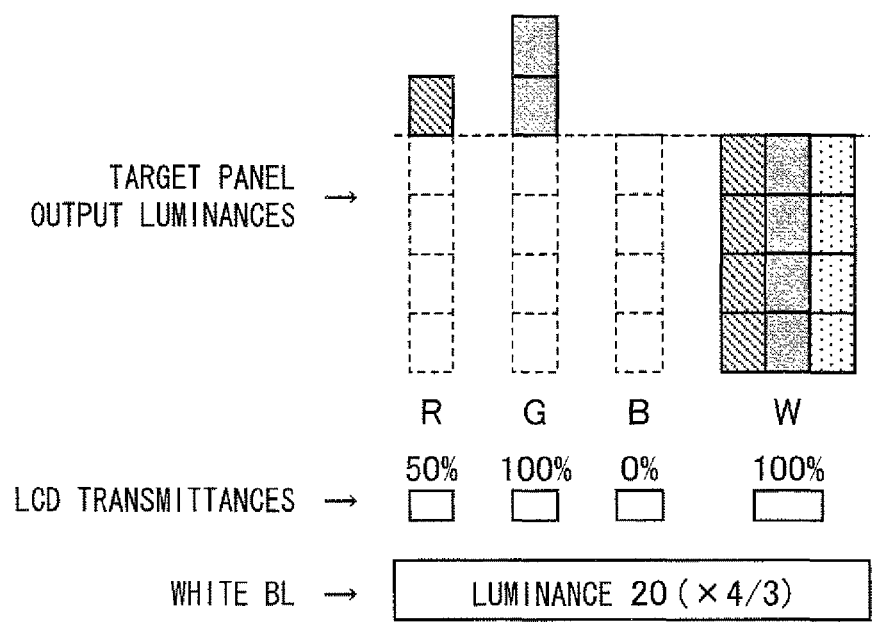

FIG. 15 (a) PRIOR ART

INPUT SIGNALS (Ri, Gi, Bi)

| A: (180, 180, 170) | B: (90, 90, 80) |
|---|---|
| C: (130, 150, 100) | D: (100, 120, 40) |

FIG. 15 (b) PRIOR ART

TRANSMISSION QUANTITIES (Rqi, Gqi, Bqi, Wqi)

| A: (60, 60, 50, 120) | B: (30, 30, 20, 60) |
|---|---|
| C: (30, 50, 0, 100) | D: (60, 80, 0, 40) |

FIG. 15 (c) PRIOR ART

BACKLIGHT VALUES OF PIXELS

| A: 60 | B: 30 |
|---|---|
| C: 50 | D: 80 |

⇒ BACKLIGHT VALUE: 80

FIG. 15 (d) PRIOR ART

TRANSMITTANCES (Rpi, Gpi, Bpi, Wpi)

| A: (0.75, 0.75, 0.63, 0.75) | B: (0.38, 0.38, 0.25, 0.38) |
|---|---|
| C: (0.38, 0.63, 0, 0.63) | D: (0.75, 1.0, 0, 0.25) |

FIG. 15 (e) PRIOR ART

DISPLAY LUMINANCES

| A: (180, 180, 170) | B: (90, 90, 80) |
|---|---|
| C: (130, 150, 100) | D: (100, 120, 40) |

TRANSMISSION LIQUID CRYSTAL DISPLAY DEVICE

This Nonprovisional application claims priority under 35 U.S.C. §119(a) on Patent Application No. 300845/2006 filed in Japan on Nov. 6, 2006 and Patent Application No. 008457/2007 filed in Japan on Jan. 17, 2007, the entire contents of which are hereby incorporated by reference.

FIELD OF THE INVENTION

The present invention relates to a transmission liquid crystal display device using an active backlight as a light source.

BACKGROUND OF THE INVENTION

There are various kinds of color displays, and these color displays are in practical use. Flat type displays are roughly categorized into a self-luminous display such as a PDP (plasma display panel) and a non-luminous display represented by an LCD (liquid crystal display device). As the LCD which is the non-luminous display, a transmission LCD having a backlight disposed on a rear side of a liquid crystal panel is known.

FIG. 11 is a cross sectional view illustrating a general structure of the transmission LCD. The transmission LCD is arranged so that a backlight 110 is disposed on a rear side of a liquid crystal panel 100. The liquid crystal panel 100 is arranged so that: a liquid crystal layer 103 is disposed between a pair of transparent substrates 101 and 102, and polarization plates 104 and 105 are respectively provided on outer sides of the pair of transparent substrates 101 and 102. Further, a color filter 106 is provided in the liquid crystal panel 100, so that it is possible to realize color display.

Although not shown, an electrode layer and an alignment film are formed so as to be positioned more inwardly than the transparent substrates 101 and 102, and a voltage applied to the liquid crystal layer 103 is controlled, thereby controlling transmission quantities of light in the liquid crystal panel 100 for each pixel. That is, the transmission LCD controls, in the liquid crystal panel 110, the transmission quantities of light emitted from the backlight 110, thereby controlling a display.

As the backlight 110, a backlight emitting white light containing three wavelengths, i.e., R, G, and B wavelengths required in a color display is mainly used. With a color filter 106, transmittances of R, G, and B lights are adjusted, thereby arbitrarily setting a luminance and a hue of a pixel. As such a backlight 110, a white light source such as an electroluminescence (EL), a cold cathode fluorescent lamp (CCFL), and a light emitting diode (LED) is generally used.

In the liquid crystal panel 100, as illustrated in FIG. 12, a plurality of pixels are disposed in a matrix manner, and each pixel is generally constituted of three sub pixels. The sub pixels are disposed so as to respectively correspond to a red (R) filter layer, a green (G) filter layer, and a blue (B) filter layer in the color filter 106. Hereinafter, these sub pixels are respectively referred to as an R sub pixel, a G sub pixel, and a B sub pixel.

Each of the R sub pixel, the G sub pixel, and the B sub pixel selectively transmits light, out of white light generated by the backlight 110, whose waveband corresponds to the sub pixel (i.e., red, green, or blue light), and absorbs light whose waveband is out of the foregoing waveband.

As to light emitted from the backlight 110 in the transmission LCD arranged in the foregoing manner, transmission quantities of light are controlled for each pixel of the liquid crystal panel 100, so that it is natural that some light is absorbed by the liquid crystal panel 100. Further, each of the R, G, and B sub pixels also in the color filter 106 absorbs light, out of white light generated by the backlight 110, whose waveband is out of a waveband corresponding to the sub pixel. In this way, a general transmission LCD has a liquid crystal panel or a color filter which absorbs a large quantity of light, so that the LCD cannot efficiently use light emitted from the backlight. This raises such a problem that the backlight consumes much power.

As a technique for reducing power consumption of the transmission LCD, there is known a technique using an active backlight capable of adjusting a luminance in accordance with a display image (for example, Japanese Unexamined Patent Publication No. 65531/1999 (Tokukaihei 11-65531) (Publication date: Mar. 9, 1999)).

That is, Tokukaihei 11-65531 discloses a technique in which an active backlight capable of adjusting a luminance is used and a display of the LCD is controlled (a luminance is controlled) by controlling transmittances of the liquid crystal panel and the luminance of the active backlight thereby reducing power consumption of the backlight.

In the technique of Tokukaihei 11-65531, the luminance of the backlight is controlled so as to correspond to a maximum luminance value of an inputted image (inputted signals). Further, a transmittance of the liquid crystal panel is adjusted so as to correspond to the luminance of the backlight.

In this case, a transmittance of a sub pixel whose input signal has a maximum value is 100%, and also a transmittance of other sub pixel is less than 100% as a result of calculation based on a backlight value. Thus, when the image is entirely dark, the backlight is made dark, thereby reducing power consumption of the backlight.

In this way, according to Tokukaihei 11-65531, brightness of the backlight is suppressed to a minimum level in accordance with input signals R, G, and B of an input image, and the backlight is made dark, so that a transmittance of liquid crystal is accordingly increased. Thus, intensity of light absorbed by the liquid crystal panel is decreased, thereby reducing power consumption of the backlight.

However, according to the conventional arrangement, it is possible to reduce power consumption of the backlight by reducing intensity of light absorbed by the liquid crystal panel but it is impossible to reduce intensity of light absorbed by the color filter. Thus, if it is possible to reduce intensity of light absorbed by the color filter, it is possible to obtain such an effect that the power consumption is further reduced.

SUMMARY OF THE INVENTION

The present invention was made in view of the foregoing problems, and an object of the present invention is to realize a transmission liquid crystal display device which can achieve further reduction of power consumption by reducing intensity of light absorbed not only by the liquid crystal panel but also by the color filter.

In order to achieve the foregoing object, a transmission liquid crystal display device according to the present invention includes: a liquid crystal panel having pixels each of which is divided into four sub pixels as red (R), green (G), blue (B), and white (W) sub pixels; and a white active backlight which is capable of controlling an emission luminance.

According to the arrangement, by using the liquid crystal panel in which a pixel is divided into four sub pixels as R, G, B, and W sub pixels, it is possible to partially incorporate R, G, and B components into the W sub pixel having no (or little) loss of light absorbed by the filter. As a result, it is possible to reduce light absorbed by the color filter, so that it is possible to realize reduction of power consumption of the transmission liquid crystal display device.

Note that, the liquid crystal panel in which a pixel is divided into four sub pixels lowers a display luminance of a pixel where light intensity of the sub pixels can be hardly incorporated into the W sub pixel. Thus, in case where the liquid crystal panel is combined with a normal backlight which cannot control an emission luminance, it is impossible to reduce power consumption. However, by combining the liquid crystal panel with a white active backlight, it is possible to reduce power consumption of the white active backlight.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5(a) to FIG. 5(e) are drawings each of which illustrates a procedure in determining the backlight luminance value and sub pixel transmittances in the liquid crystal display device.

FIG. 10(a) and FIG. 10(b), showing another embodiment of the present invention, are block diagrams each of which illustrates essential portions of a transmission liquid crystal display device.

FIG. 13(a) is a drawing illustrating how to calculate a backlight luminance value in accordance with a first technique. FIG. 13(b) is a drawing illustrating how to calculate the backlight luminance value in accordance with a second technique.

FIG. 15(a) to FIG. 15(e) are drawings each of which illustrates a procedure in determining the backlight luminance value and sub pixel transmittances of the liquid crystal display device in accordance with the second technique.

DESCRIPTION OF THE EMBODIMENTS

Embodiment 1

Figure 1:
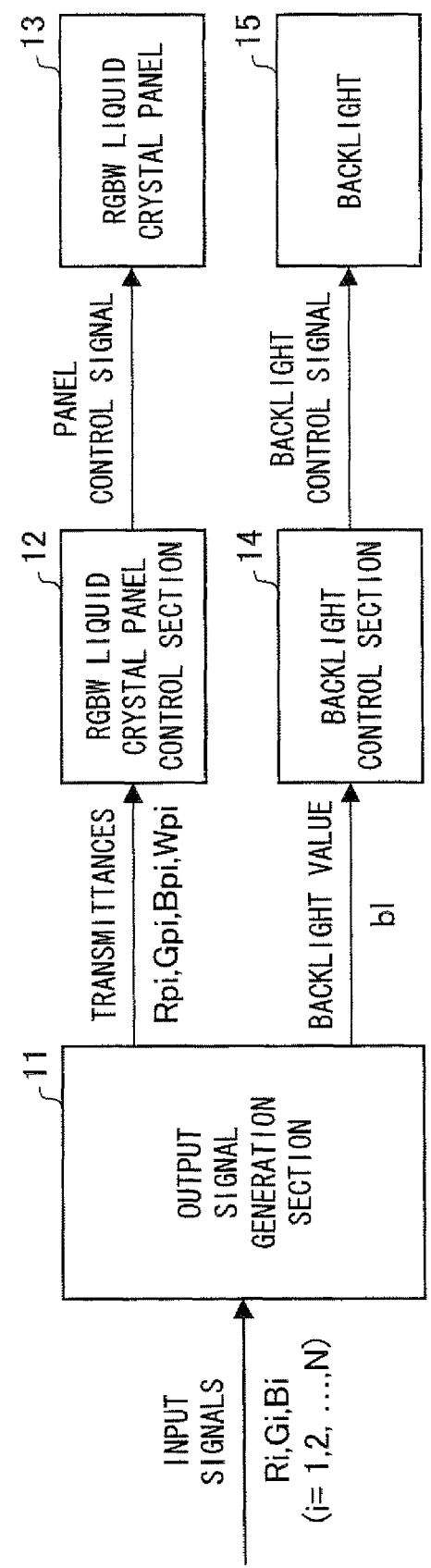
FIG. 1, showing an embodiment of the present invention, is a block diagram illustrating essential portions of a transmission liquid crystal display device.
Figure 2:
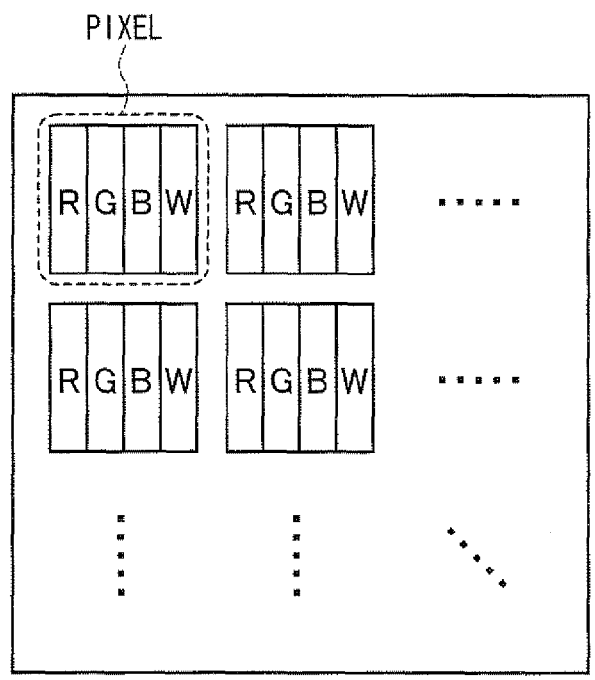
FIG. 2(a) and FIG. 2(b) are drawings each of which illustrates an example where sub pixels are disposed in the transmission liquid crystal display device.
Figure 2:
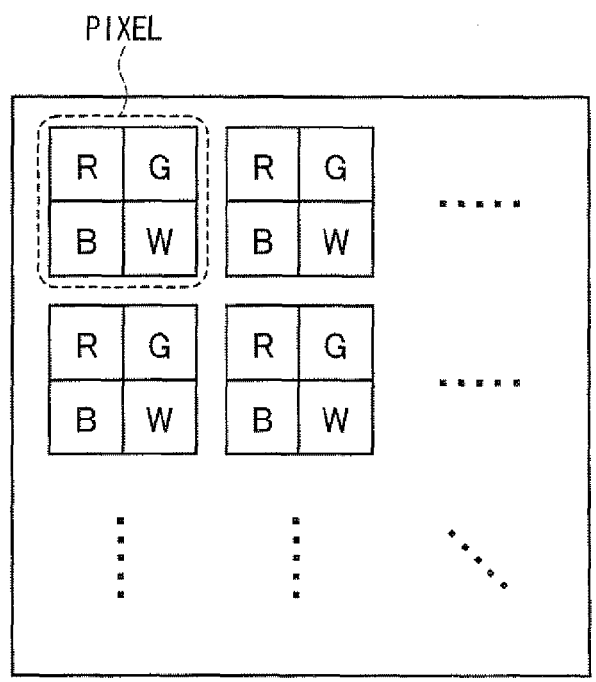
Figure 3:
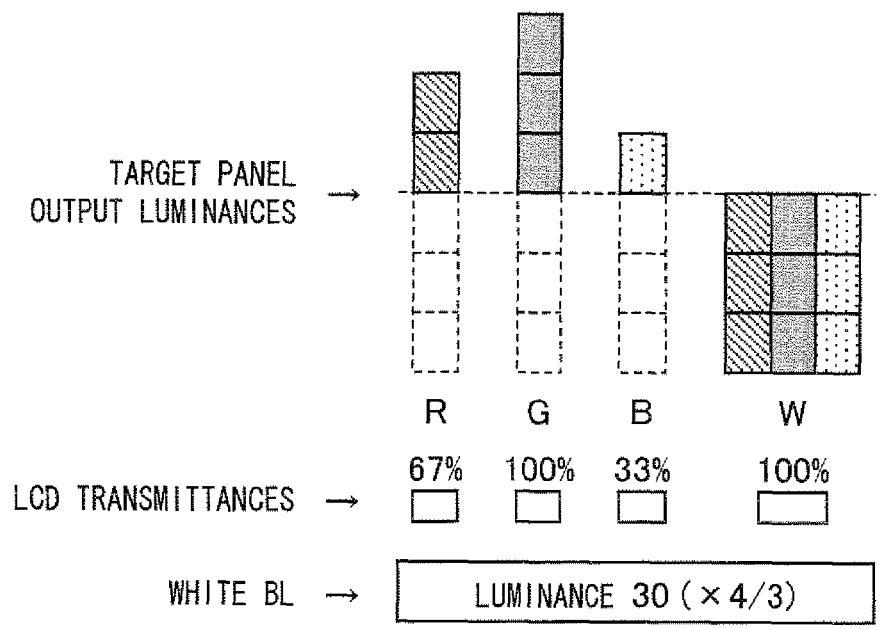
FIG. 3(a) is a drawing illustrating how to calculate a backlight luminance value in the present liquid crystal display device.
FIG. 3(b) is a drawing illustrating how to calculate a backlight luminance value in Tokukaihei 11-65531 for comparison.
Figure 3:
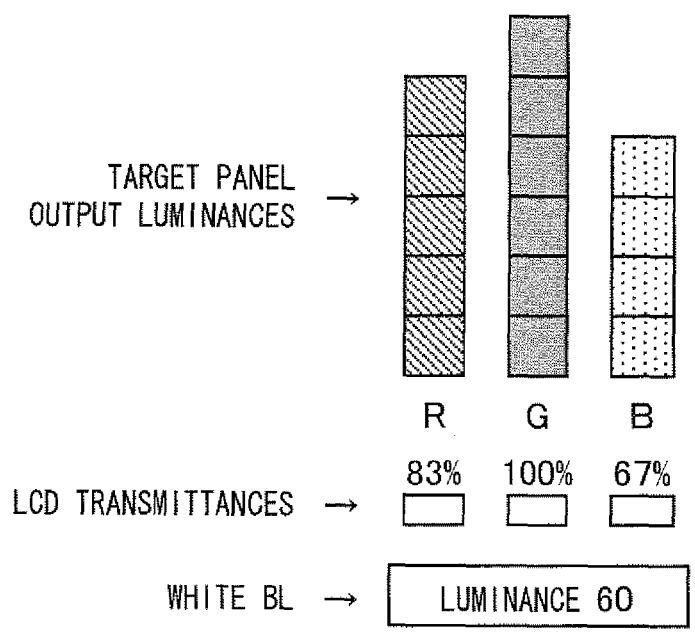
Figure 4:
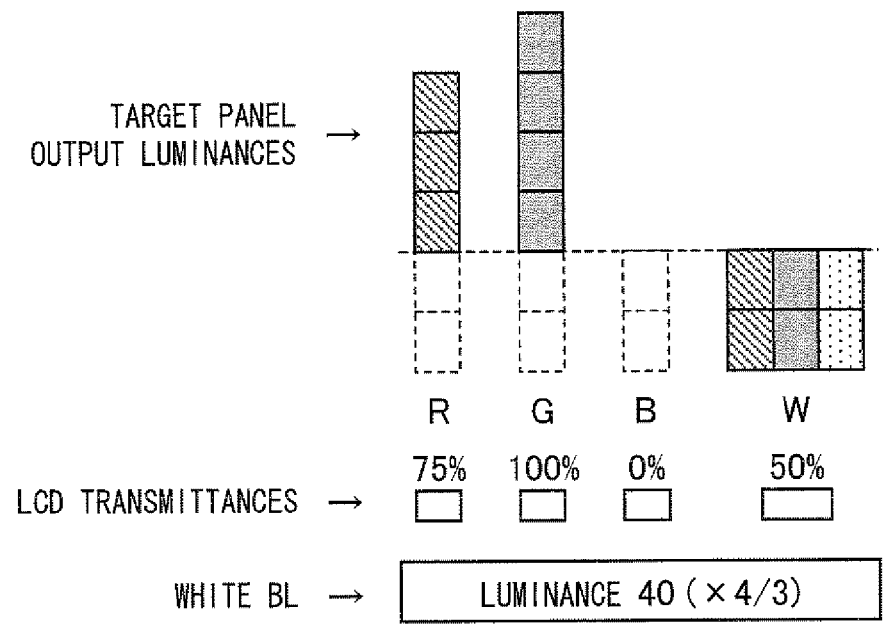
FIG. 4(a) is a drawing illustrating how to calculate a backlight luminance value in the present liquid crystal display device.
FIG. 4(b) is a drawing illustrating how to calculate a backlight luminance value in Tokukaihei 11-65531 for comparison.
Figure 4:
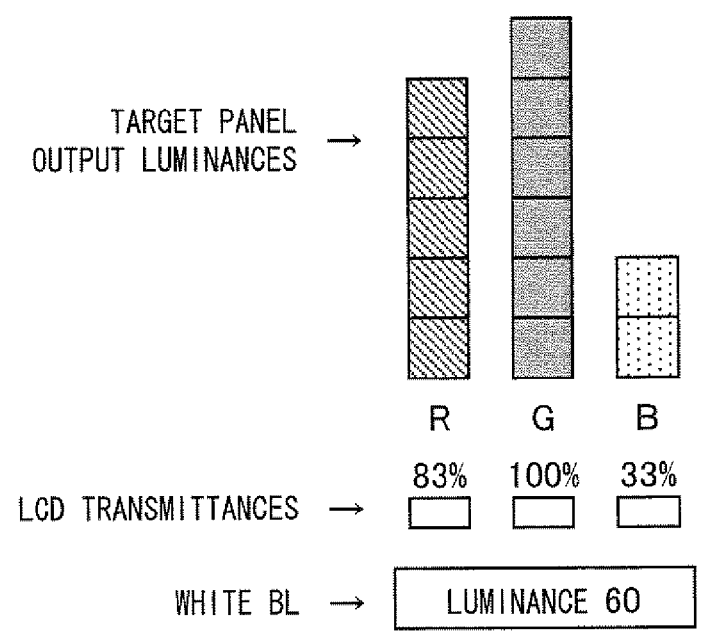

The following description will explain one embodiment of the present invention with reference to FIG. 1 to FIG. 10. First, with reference to FIG. 1, a schematic arrangement of a liquid crystal display device according to the present embodiment (hereinafter, referred to as the present liquid crystal display device) is described as follows.

The present liquid crystal display device includes an output signal generation section 11, an RGBW liquid crystal panel control section (hereinafter, referred to merely as a liquid crystal panel control section) 12, an RGBW liquid crystal panel (hereinafter, referred to merely as a liquid crystal panel) 13, a backlight control section 14, and a backlight 15.

The liquid crystal panel 13 is arranged so that an N-number of pixels are disposed in a matrix manner, and each pixel is made up of four sub pixels as R (red), green (G), blue (B), and W (white) sub pixels as illustrated in FIG. 2(a) and FIG. 2(b). Note that, shapes and a positional relation of the R, G, B, and W sub pixels in each pixel are not particularly limited. Further, the backlight 15 uses a white light source such as a cold cathode fluorescent light (CCFL) and a white light emitting diode (white LED) and serves as an active backlight which can control brightness of emitted light.

In a color filter (not shown), R, G, and B filter layers are disposed so as to respectively correspond to the R, G, and B sub pixels of the liquid crystal panel 13. Thus, each of the R, G, and B sub pixels selectively transmits light, out of white light, which has a corresponding waveband, and absorbs light whose waveband is out of the foregoing waveband. Further, the W sub pixel basically has no absorption filter layer in the color filter. That is, light transmitted by the W sub pixel is not absorbed by the color filter at all and is projected from the liquid crystal panel 13 as the white light without any modification. However, it may be so arranged that the W sub pixel has a filter layer which absorbs less light than the R, G, and B color filters.

The present liquid crystal display device receives image information as RGB signals from the outside, e.g., from a personal computer or a television tuner, and processes the RGB signals as input signals $Ri$, $Gi$, and $Bi$ ($i=1, 2, \ldots, N$). The output signal generation section 11 is means for calculating, on the basis of the input signals, transmittances of the sub pixels in the liquid crystal panel 13 and a backlight value in the backlight 15. That is, the output signal generation section 11 calculates a backlight value $b1$ on the basis of the input signals $Ri$, $Gi$, and $Bi$ and converts the input signals $Ri$, $Gi$, and $Bi$ into output signals (transmittances) $Rpi$, $Gpi$, and $Wpi$ suitable for the backlight $b1$.

The thus calculated backlight $b1$ is outputted to the backlight control section 14, and the backlight control section 14 adjusts a luminance of the backlight 15 in accordance with the backlight value $b1$. The backlight 15 uses a white light source such as CCFL or a white LED, and the backlight control section 14 controls the backlight 15 so as to exhibit brightness relative to the backlight value. How to control the brightness of the backlight 15 varies depending on a type of the light source used, but it is possible to control the brightness, for example, by applying a voltage relative to the backlight value or flowing a current relative to the backlight value. Further, in case where the backlight is an LED or the like, it is possible to control the brightness by changing a duty ratio on the basis of pulse width modulation (PWM). Further, in case where brightness of the backlight serving as a light source has a nonlinear characteristic, it is possible to adopt such a method that a voltage applied to the light source or a current flown to the light source is calculated with reference to a look-up table based on the backlight value so as to control the brightness of the backlight, thereby controlling the brightness to a desired level.

The output signals Rpi, Gpi, Bpi, and Wpi are outputted to the liquid crystal panel control section 12, and the liquid crystal panel control section 12 controls the sub pixels of the liquid crystal panel 13, so as to have desired transmittances, in accordance with the output signals. The liquid crystal panel control section 12 includes a scanning line driving circuit, a signal line driving circuit, and the like, and generates a scanning signal and a data signal, so as to cause panel control signals such as the scanning signal and the data signal to drive the liquid crystal panel 13. The output signals Rpi, Gpi, Bpi, and Wpi are used to generate data signals. In controlling the transmittances of the liquid crystal panel 13, it is possible to adopt: a method in which a voltage relative to a transmittance of each sub pixel is applied so as to control the transmittances of the liquid crystal panel; a method in which a voltage applied to the liquid crystal panel is looked up in the look-up table on the basis of the transmittances of the sub pixels so that the nonlinear characteristic is made linear so as to control the transmittances of the liquid crystal panel to have desired values; or a similar method.

Note that, in the liquid crystal display device of the present invention, the input signals are not limited to the aforementioned RGB signals, and the input signals may be color signals such as YUV signals. In case where color signals other than the RGB signals are inputted, it may be so arranged that the color signals are converted into RGB signals and the thus converted signals are inputted to the output signal generation section 11, or it may be so arranged that the output signal generation section 11 can convert color signals other than the RGB signals into RGB signals.

In the present liquid crystal display device, a display luminance of each pixel of the liquid crystal panel 13 is expressed by a product of backlight brightness (emission luminance) and a transmittance of each sub pixel. Herein, a display principle and reduction of power consumption in the present liquid crystal display device are detailed as follows.

According to a method in which the backlight luminance value and the sub pixel transmittance of the present liquid crystal display device are determined, first, a bare minimum of the backlight luminance value of all pixels positioned in each display region corresponding to the backlight is calculated. At this time, depending on a content of display data for pixels, two methods are applicable in calculating the backlight luminance value. Specifically, depending on a relation between a maximum luminance of sub pixels in a target pixel (i.e., max (Ri, Gi, Bi)) and a minimum luminance thereof (i.e., min (Ri, Gi, Bi)), how to calculate a backlight luminance value with respect to the target pixel varies.

First, with reference to FIG. 3(a) and FIG. 3(b), the following describes how to calculate the backlight luminance value in such a pixel that min (Ri, Gi, Bi)≧max (Ri, Gi, Di)/2.

Herein, FIG. 3(a) is a drawing illustrating how to calculate the backlight luminance value in the present liquid crystal display device. Further, FIG. 3(b) is a drawing illustrating how to calculate a backlight luminance value in Tokukaihei 11-65531 for comparison.

Let us consider a case where a target panel output luminance of a certain target pixel is (Ri, Gi, Bi) (50, 60, 40) in FIG. 3(a) and FIG. 3(b). At this time, a G luminance value 60 is max (Ri, Gi, Bi), a B luminance value 40 is min (Ri, Gi, Bi) is min (Ri, Gi, Bi), and min (Ri, Gi, Bi)≧max (Ri, Gi, Di)/2 is satisfied.

According to the display method disclosed by Tokukaihei 11-65331, the backlight luminance value is set to max (Ri, Gi, Bi)=60, and transmittances of the sub pixels are determined so as to correspond to the backlight value. That is, transmittances of the R, G, and B sub pixels are respectively set to 83% (=50/60), 100% (=60/60), and 67% (=40/60).

While, in the present liquid crystal display device, a component corresponding to max (Ri, Gi, Bi)/2 out of each of R, G, and B components of the input signals Ri, Gi, and Bi is incorporated into a luminance value of the W component. As a result, the input signals (Ri, Gi, Bi) (50, 60, 40) indicated by RGB signals are converted into signals (Rqi, Gqi, Bqi, Wqi) =(20, 30, 10, 30) indicated by RGBW signals. Further, in the target pixel, the luminance value of the backlight is set so that max (Rqi, Gqi, Bqi, Wqi)=30.

Transmittances of the R, G, B, and W sub pixels are determined in accordance with the backlight luminance value. Specifically, the transmittance of each sub pixel is determined by (output luminance value)/(backlight luminance value). That is, transmittances of the R, G, B, and W sub pixels are respectively set to 67% (=20/30), 100% (=30/30), 33% (=10/30), 100% (=30/30). However, the transmittances illustrated in FIG. 3(a) are examples of transmittances in case where each of backlight luminance values calculated in the target pixel has the largest value out of plural backlight values calculated with respect to all the pixels and the largest value is adopted as a luminance value of the backlight.

Further, in order to compare the aforementioned backlight luminance value of the present liquid crystal display device with a backlight luminance value calculated in accordance with a method disclosed by Tokukaihei 11-65531, it is necessary to take an area ratio of sub pixels into consideration. That is, in Tokukaihei 11-65531, a single pixel is divided into three sub pixels, but the present liquid crystal display device is arranged so that a single pixel is divided into four sub pixels. Thus, in the present liquid crystal display device, an area size of each sub pixel is ¾ of an area size of each sub pixel of Tokukaihei 11-65531. In order to compensate for the lower area size of each sub pixel, the present liquid crystal display device is arranged so that the luminance value of the backlight is set to be 4/3 times as large as that of Tokukaihei 11-65531. Thus, the backlight luminance value of the present liquid crystal display device can be compared with the backlight luminance value of Tokukaihei 11-65531 in accordance with the same standard.

As a result, when the backlight luminance value of the example illustrated in FIG. 3(a) is corrected in accordance with the standard on which the backlight luminance value of FIG. 3(b) is based, this results in such condition that (4/3)× 60/2=40. In the example illustrated in FIG. 3(b) in which display is carried out in the same manner, the backlight luminance value is 60. This shows that the present invention realizes reduction of power consumption in the target pixel.

Next, with reference to FIG. 4(a) and FIG. 4(b), the following describes how to calculate a backlight luminance value in such a pixel that min (Ri, Gi, Bi)<max (Ri, Gi, Bi)/2.

Herein, FIG. 4(a) is a drawing illustrating how to calculate a backlight luminance value in the present liquid crystal display device. Further, FIG. 4(b) is a drawing illustrating a backlight luminance value in Tokukaihei 11-65531 for comparison.

Let us consider a case where target panel output luminances of a certain target pixel are (Ri, Gi, Bi)=(50, 60, 20) in FIG. 4(a) and FIG. 4(b). In this case, a G luminance 60 is max (Ri, Gi, Bi), a B luminance 20 is min (Ri, Gi, Bi), and min (Ri, Gi, Bi)<max (Ri, Gi, Bi)/2 is satisfied.

According to the display method disclosed by Tokukaihei 11-65531, the luminance value of the backlight is set so that max (RI, Gi, Bi)=60, and transmittances of the sub pixels are determined in accordance with the backlight value. That is, transmittances of R, G, and B sub pixels are respectively 83% (=50/60), 100 (=60/60), and 33% (=20/60).

On the other hand. In the present liquid crystal display device, a value indicative of a component corresponding to min (Ri, Gi, Di) out of each of R, G, and B components of the input signals Ri, Gi, and Bi is incorporated into a luminance value of the W component. As a result, the input signals (Ri, Gi, Bi)=(50, 60, 20) indicated by RGB signals are converted into signals (Rqi, Gqi, Bqi, Wqi)=(30, 40, 0, 20) indicated by RGBW signals. Further, in the target pixel, the luminance value of the backlight is set to max (Rqi, Gqi, Bqi, WqI)=40. Further, transmittances of the R, G, B, and W sub pixels are determined in accordance with the backlight value. Specifically, a transmittance of each sub pixel is determined in accordance with (output luminance value)/(backlight luminance value). That is, the transmittances of the R, G, B, and W sub pixels are respectively set to 75% (=30/40), 100% (=40/40), 0% (=0/40), 50 (=20/40).

However, the transmittances illustrated in FIG. 4(a) are examples of transmittances in case where a backlight luminance value calculated in the target pixel has the largest value out of plural backlight values calculated with respect to all the pixels and the largest value is adopted as a luminance value of the backlight. Further, also in an example illustrated in FIG. 4(a), the luminance value of the backlight is set to be 4/3 times as large as that of Tokukaihei 11-65531. Thus, the backlight luminance value of the present liquid crystal display device can be compared with the backlight luminance value of Tokukaihei 11-65531 in accordance with the same standard.

As a result, in the example illustrated in FIG. 4(a), the backlight luminance value is such that (4/3)×(60−20)=53.3. In the example illustrated in FIG. 4(b) in which display is carried out in the same manner, the backlight luminance value is 60. This shows that the present invention realizes reduction of power consumption in the target pixel.

Each of FIGS. 3(a) and 3(b) and FIGS. 4(a) and 4(b) illustrates how to calculate the bare minimum backlight luminance value of each pixel. In accordance with the aforementioned method, a bare minimum backlight value is calculated with respect to all pixels positioned in each display region corresponding to the backlight. Out of plural backlight luminance values calculated in this manner, a maximum value thereof is set as the luminance value of the backlight.

With reference to FIG. 5(a) to FIG. 5(e), the following describes a procedure for determining the backlight luminance value and the sub pixel transmittances of the present liquid crystal display device in accordance with the aforementioned method.

FIG. 5(a) illustrates the input signals (Ri, Gi, Bi) of a display region corresponding to a certain backlight. In order to simplify descriptions, explanation is given on the assumption that the display region is constituted of four pixels A to D.

As to these pixels A to D, the input signals (Ri, Gi, Bi) are respectively converted into output signals (Rqi, Gqi, Bqi, Wqi) indicated by RGBW signals. The conversion results in a state illustrated in FIG. 5(b). Further, a backlight luminance value calculated for each pixel is as illustrated in FIG. 5(c). As a result, the backlight luminance value is set to a maximum value out of plural backlight luminance values calculated for each pixel, that is, to 100.

With respect to 100 which is a value obtained in this manner, transmittances (Rpi, Gpi, Bpi, Wpi) of the pixel are calculated in accordance with values of the output signals (Rqi, Gqi, Bqi, Wqi) illustrated in FIG. 5(b), and results of the calculation are as illustrated in FIG. 5(d). Further, final display luminances of the pixels are as illustrated in FIG. 5(e). This shows that the display luminances are identical to the luminance values of the input signals (Ri, Gi, Bi) illustrated in FIG. 5(a).

Note that, the display method of the present liquid crystal display device does not allow all the pixels to reduce power consumption. For example, in case where max (Ri, Gi, Bi) is a maximum luminance displayable in the panel (for example, 100) and min (Ri, Gi, Di) is 0, the backlight luminance in the pixel is (4/3)×(100−0)=133.3. If display is carried out in the same manner in accordance with Tokukaihei 11-65531, the backlight luminance is 100, so that the backlight luminance value of the present liquid crystal display device is greater. That is, the present liquid crystal display device may insufficiently reduce power consumption in case of carrying out such image display that a luminance of a certain color component is extremely great and a luminance of other certain color component is extremely small. However, also in a general display device of a television and a personal computer, it is often that power consumption can be reduced in a general halftone image display which may be most frequently carried out. A result of simulation carried out by the inventors of the present invention with an actual moving image shows that: power consumption was reduced by about 18% in the backlight average luminance of the present liquid crystal display device compared with the display method disclosed by Tokukaihei 11-65531.

In the present liquid crystal display device, the backlight luminance value and the sub pixel transmittance are determined by the output signal generation section 11. An example of an arrangement of the output signal generation section 11 is described as follows with reference to FIG. 6.

Figure 6:
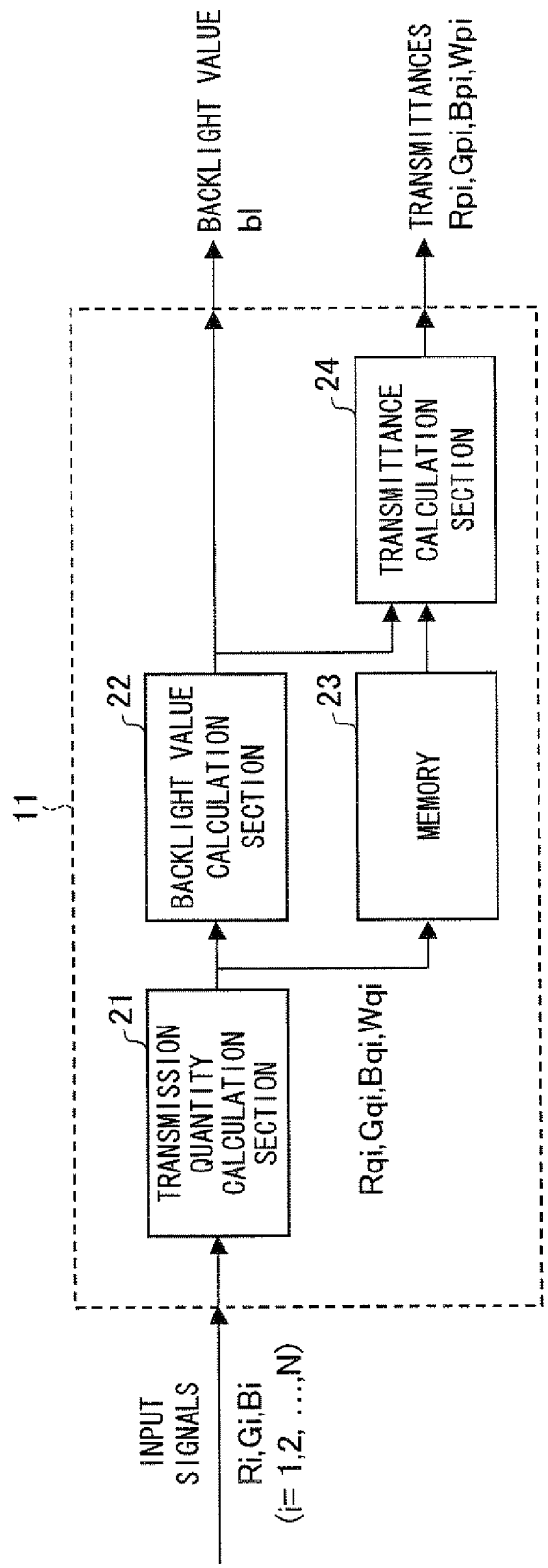
FIG. 6 is a block diagram illustrating an example of an arrangement of an output signal generation section of the transmission liquid crystal display device.

As illustrated in FIG. 6, the output signal generation section 11 includes a transmission quantity calculation section 21, a backlight value calculation section 22, a memory 23, and a transmittance calculation section 24.

Input signals (Ri, Gi, Bi) inputted to the output signal generation section 11 are first inputted to the transmission quantity calculation section 21. The transmission quantity calculation section 21 calculates transmission quantities Rqi, Gqi, Bqi, Wqi of the sub pixels in accordance with the input signals (Ri, Gi, Bi). In other words, RGB signals for each pixel are converted into RGBW signals. The conversion is carried out in accordance with the method illustrated in FIG. 3(a) or the method illustrated in FIG. 4(a).

The RGBW signals (Rqi, Gqi, Bqi, Wqi) calculated by the transmission quantity calculation section 21 are sent to the backlight value calculation section 22 and the memory 23. The backlight value calculation section 22 calculates a backlight value b1 in accordance with the RGBW signals (Rqi, Gqi, Bqi, Wqi). That is, the backlight value calculation section 22 determines a maximum value of transmission quantities of all sub pixels of all pixels (N number of pixels) of a single image as the backlight value b1. Further, the memory 23 allows the thus sent RGBW signals (Rqi, Gqi, Bqi, Wqi) to be stored therein without any modification.

The transmittance calculation section 24 calculates transmittances (Rpi, Gpi, Bpi, Wpi) of the sub pixels in accordance with the backlight value b1 calculated by the backlight value calculation section 22 and the RGBW signals (Rqi, Gqi, Bqi, Wqi) stored in the memory 23. In this case, the transmittances Rpi, Gpi, Bpi, Wpi are respectively calculated in accordance with the following expressions.

$$Rpi = Rqi/b1$$

$$Gpi = Gqi/b1$$

$$Bpi = Bqi/b1$$

$$Wpi = Wqi/b1$$

Note that. In the foregoing expressions, each of the calculated transmittances Rpi, Gpi, Bpi, Wpi is a value ranging from 0 to 1. In case where it is difficult to treat a value less than 1, a value obtained by multiplying a right side value with a constant number may be used as the transmittance.

In the process carried out by the output signal generation section 11 illustrated in FIG. 6, the transmission quantities of all the sub pixels which were calculated by the transmission quantity calculation section 21 in accordance with the input signals Ri, Gi, Bi are stored in the memory 23. The transmission quantity calculation section 24 uses the transmission quantities stored in the memory 23 and the backlight value calculated by the backlight value calculation section 22 so as to calculate transmittances. That is, in the foregoing arrangement, the memory 23 is provided so as to store the transmission quantities of all the sub pixels, which were calculated by the transmission quantity calculation section 21, until the backlight value calculation section 22 calculates the backlight value b1. According to the arrangement, the transmission quantities have to be calculated only once in the output signal generation section 11, so that it is possible to simplify a hardware arrangement of the output signal generation section 11.

Figure 7:
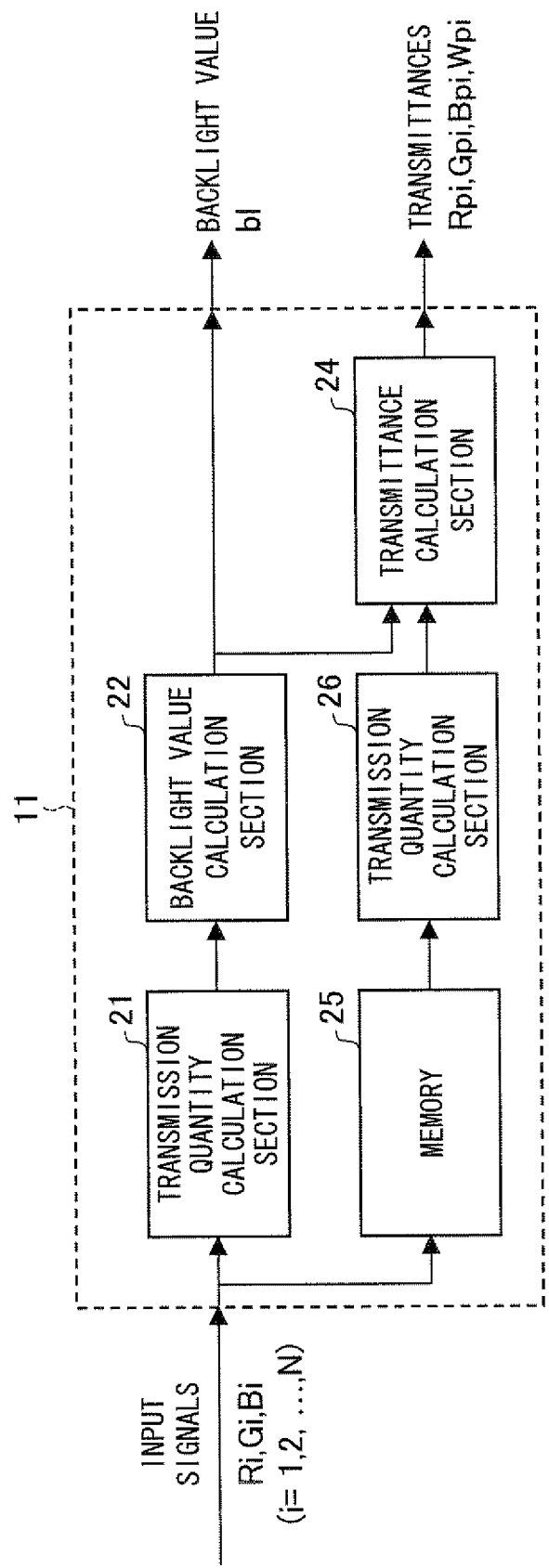
FIG. 7 is a block diagram illustrating an example of an arrangement of an output signal generation section of the transmission liquid crystal display device.

However, the output signal generation section 11 of the present invention is not limited to the foregoing arrangement. The output signal generation section 11 may be arranged as illustrated in FIG. 7. The output signal generation section 11 illustrated in FIG. 7 includes transmission quantity calculation sections 21 and 26, a backlight value calculation section 22, a memory 25, and a transmittance calculation section 24.

In this arrangement, the memory 25 allows the input signal (Ri, Gi, Bi) inputted to the output signal generation section 11 to be stored therein without any modification. That is) the output signal generation section 11 causes the transmission quantity calculation section 21 to calculate the transmission quantities and causes the backlight value calculation section 22 to calculate the backlight value b1 while storing the input signals Ri, Gi, Bi in the memory 25. At the same time, the output signal generation section 11 causes the transmission quantity calculation section 26 to calculate transmission quantities again in accordance with the input signals Ri, Gi, Bi stored in the memory 25. The transmission quantity calculation section 26 can be arranged in the same manner as in the transmission quantity calculation section 21. The transmittance calculation section 24 uses the transmission quantities calculated by the transmission quantity calculation section 26 and the backlight value calculated by the backlight value calculation section 22 so as to calculate transmittances. In this arrangement, the memory 25 allows only information of RGB components to be stored therein, so that it is possible to reduce a storage capacity by an amount of information of a W component compared with the memory 23 illustrated in FIG. 6.

Next, a more detail arrangement of the transmission quantity calculation section 21 is described as follows with reference to FIG. 8. The transmission quantity calculation section 21 carries out the following process for each pixel.

Figure 8:
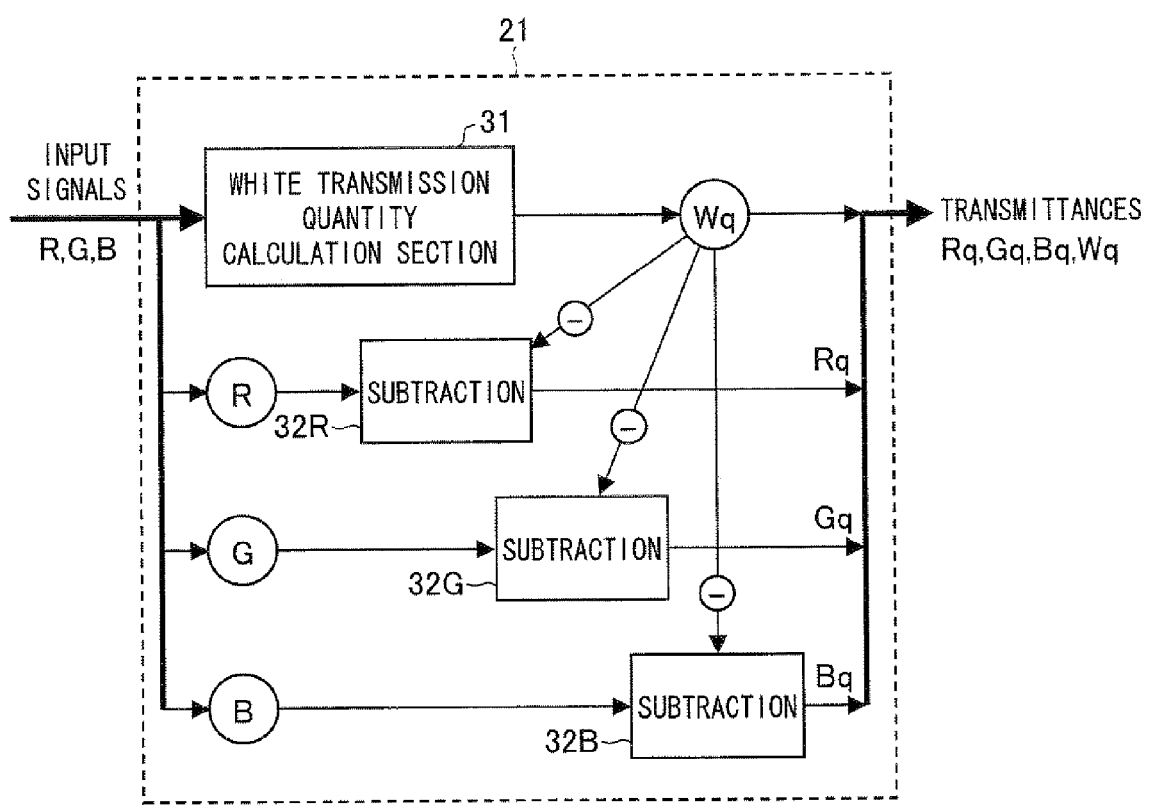
FIG. 8 is a block diagram illustrating an example of an arrangement of a transmission quantity calculation section in the output signal generation section.
Figure 9:
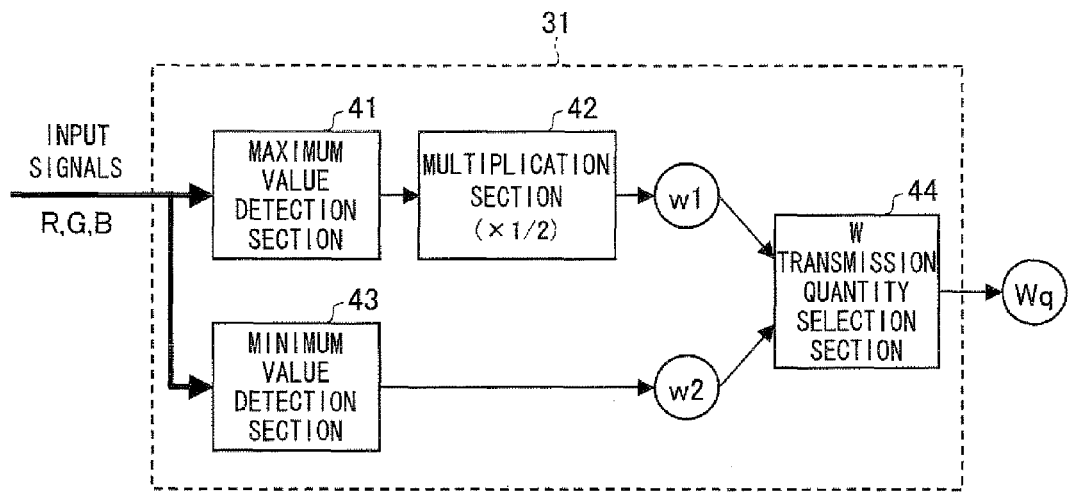
FIG. 9(a) to FIG. 9(c) are block diagrams each of which illustrates an example of an arrangement of a white transmission quantity calculation section in the transmission quantity calculation section.
Figure 9:
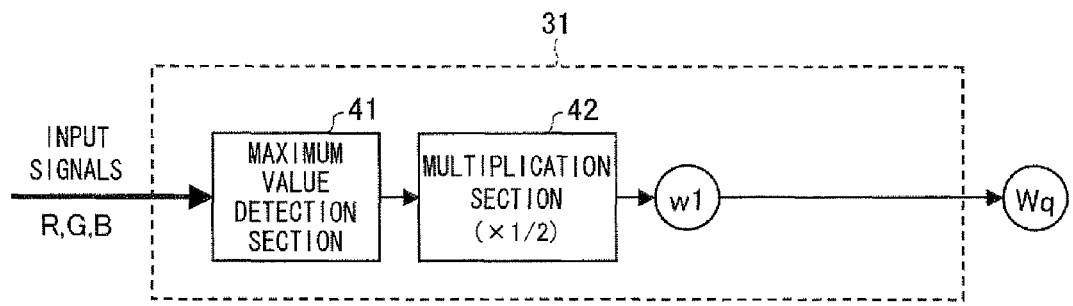
Figure 9:
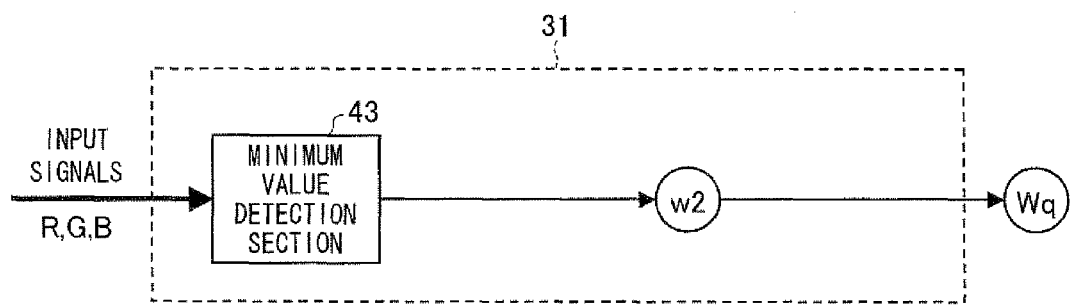
Figure 11:
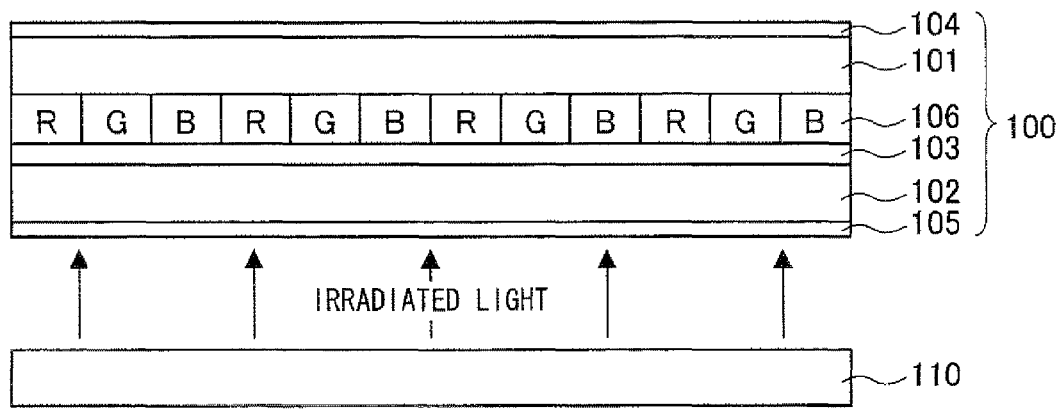
FIG. 11 is a cross sectional view illustrating a general structure of a transmission liquid crystal display device.
Figure 12:
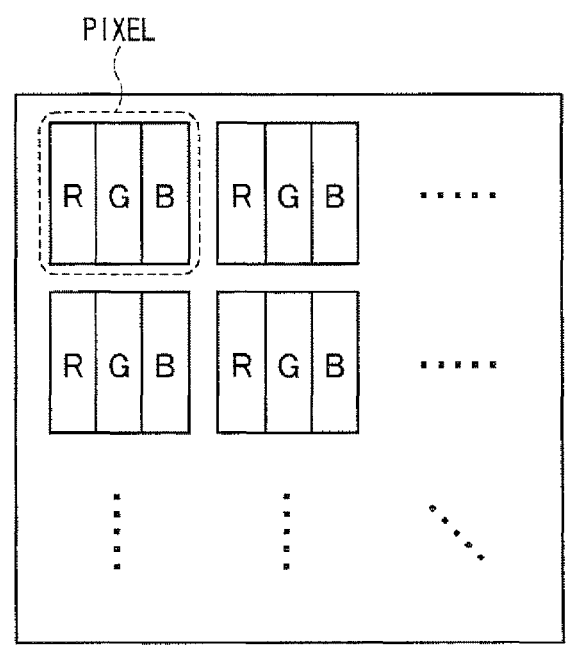
FIG. 12 is a drawing illustrating an example of a general arrangement of sub pixels in the transmission liquid crystal display device.

As illustrated in FIG. 8, the transmission quantity calculation section 21 includes a white transmission quantity calculation section 31 and three subtraction sections 32R, 32G, and 32B, corresponding to R, G, and B colors respectively. The white transmission quantity calculation section 31 calculates a W transmission quantity Wq of a W sub pixel in accordance with the input signals R, G, and B. Further, each of the subtraction sections 32R, 32G, and 32B subtracts the W transmission quantity Wq from each of the input signals R, G, and B so as to give the thus obtained value as each of the transmission quantities Rq, Gq, and Bq of the sub pixels.

Further, a more detail arrangement of the white transmission quantity calculation section 31 is described as follows with reference to FIG. 9(a) to FIG. 9(c).

FIG. 9(a) illustrates an arrangement of the white transmission quantity calculation section 31 adopting two methods illustrated in FIG. 3(a) and FIG. 4(a). In the arrangement of FIG. 9(a), the white transmission quantity calculation section 31 includes a maximum value detection section 41, a multiplication section 42, a minimum value detection section 43, and a W transmission quantity detection selection section 44.

The maximum value detection section 41 and the multiplication section 42 are arranged so as to calculate a first W transmission quantity w1 in accordance with the method illustrated in FIG. 3(a). That is, the first W transmission quantity w1 is calculated by causing the maximum value detection section 41 to detect a maximum value from the input signals R, G, and B and by causing the multiplication section 42 to multiply the maximum value by ½.

Further, the minimum value detection section 43 is arranged so as to calculate a second W transmission quantity w2 in accordance with the method illustrated in FIG. 4(a). That is, the second W transmission quantity w2 is calculated by causing the minimum value detection section 43 to detect a minimum value from the input signals R, G, and B.

The first W transmission quantity w1 and the second W transmission quantity w2 having been calculated in this manner are inputted to the W transmission quantity selection section 44, and the W transmission quantity selection section 44 selects a smaller one of the first W transmission quantity w1 and the second W transmission quantity w2 as the W transmission quantity Wq.

Note that, in the arrangement illustrated in FIG. 9(a), both the first W transmission quantity w1 and the second W transmission quantity w2 are calculated with respect to all pixels, and a smaller one of the first W transmission quantity w1 and the second W transmission quantity w2 is used as the W transmission quantity Wq. In case where this arrangement is adopted, the first W transmission quantity w1 is selected as the W transmission quantity Wq in such a pixel that min (Ri, Gi, Bi)≧max (Ri, Gi, Bi)/2. Further, in such a pixel that min (Ri, Gi, Bi)<max (Ri, Gi, Bi)/2, the second W transmission quantity w2 is selected as the W transmission quantity Wq.

Further, in order to simplify the arrangement of the white transmission quantity calculation section 31, it may be so arranged that only either the first W transmission quantity w1 or the second W transmission quantity w2 is calculated so as to determine the quantity as the W transmission quantity Wq.

FIG. 9(a) illustrates an arrangement of the white transmission quantity calculation section 31 in case where only the first W transmission quantity w1 is calculated and the thus calculated quantity is determined as the W transmission quantity Wq. In this arrangement, when the backlight value is the same as a value of the W transmission quantity w1, a sub pixel of a color component having a maximum value has the same transmission quantity as that of the W sub pixel. That is, two sub pixels can transmit light of the backlight, so that it is possible to most efficiently reduce power consumption of the backlight.

Note that, according to the arrangement, the subtraction sections 32R, 32G, and 32B of the transmission quantity calculation section 21 may give negative values as a result of subtraction. Thus, the subtraction sections 32R, 32G, and 32B may calculate Rq, Gq, and Bq as follows so that the calculated Rq, Gq, and Bq do not have negative values.

$$Rq=\max\{R-Wq,0\}$$

$$Gq=\max\{G-Wq,0\}$$

$$Bq=\max\{B-Wq,0\}$$

FIG. 9(c) illustrates an arrangement of the white transmission quantity calculation section 31 in case where only the second W transmission quantity w2 is calculated and the calculated quantity is determined as the W transmission quantity Wq. The transmission quantity calculation section 21 arranged in this manner can convert the input signals R, G, and B into R, G, B, and W signals without changing the respective color components.

The process carried out by the output signal generation section 11 can be realized with software. The following describes a procedure in realizing the process with software. Herein, the arrangement is described on the assumption that n number of pixels are provided in the backlight region. Note that, in case of realizing the process of the output signal generation section 11 with software, the output signal generation section 11 is constituted of a CPU or the like, but an arrangement of its operation part is basically the same as the arrangements illustrated in FIG. 6 to FIG. 9.

As to input signals Ri, Gi, Bi (i=1, 2, . . . , N) to the output signal generation section, a maximum value and a minimum value in an i-th pixel are calculated, and a value obtained by multiplying the maximum value by ½ is set as w1, and the minimum value is set as w2. A smaller one of W1 and W2 is set as a W transmission quantity Wqi of the W sub pixel. That is, these values are as follows.

$$W1=\max\{Ri,Gi,Bi\}/2$$

$$W2=\min\{Ri,Gi,Bi\}$$

$$Wqi=\min\{w1,w2\}$$

Next, transmission quantities of the R, G, and B sub pixel are calculated as follows.

$$Rqi=Ri-Wqi$$

$$Gqi=Gi-Wqi$$

$$Bqi=Bi-Wqi$$

A white component outputted from the W sub pixel includes R, G, and B components. According to the foregoing expressions, transmission quantities of the sub pixels are the same as quantities of the input signals Ri, Gi, and Bi. This is apparent also from the following expressions obtained by modifying the foregoing expressions.

$$Ri=Rqi+Wqi$$

$$Gi=Gqi-Wqi$$

$$Bi=Bqi+Wqi$$

Next, a backlight value b1 is calculated in accordance with transmission quantities of all sub pixels. The backlight value b1 is a maximum value of the transmission quantities of all the sub pixels. That is, the backlight value b1 is expressed as follows.

$$b1=\max\{Rq1,Gq1,Bq1,Wq1,Rq2,Gq2,Dq2,Wq2, \ldots \\ RqN,GqN,BqN,WqN\}$$

If the maximum value of the transmission quantities of all the sub pixels is the backlight value, a transmittance of a sub pixel whose transmission quantity is the maximum value can be made 100%.

Lastly, transmittances of the sub pixels are calculated as follows in accordance with the thus calculated backliglht value b1.

$$Rpi=Rqi/Wb$$

$$Gpi=Gqi/Wb$$

$$Bpi=Bqi/Wb$$

$$Wpi=Wqi/Wb$$

Alternatively, a value obtained by multiplying a right side value with a constant number may be used as the transmittance.

In the present liquid crystal display device, a backlight 15 is provided basically so as to correspond to a plurality of pixels. Thus, for example, the liquid crystal display device illustrated in FIG. 1 is arranged so that a back light 15 corresponds to an entire display screen of the liquid crystal panel 13. However, the present invention is not limited to this arrangement and may be arranged so that: the display screen of the liquid crystal panel 13 is divided into plural regions, and a plurality of backlights are provided so as to allow backlight luminances to be adjusted respectively corresponding to the regions.

Each of FIG. 10(a) and FIG. 10(b) illustrates an example where two backlights are provided so as to correspond to a single display region, but the number of backlights is not limited.

FIG. 10(a) illustrates an example where output signal generation sections 51, liquid crystal panel control sections 52, and backlight control sections 54 are provided so that the number of every these sections corresponds to the number of backlights. In this arrangement, input signals Ri, Gi, Bi, (i=1, 2, . . . , N) having been inputted are divided into every N/2 signals in accordance with the corresponding backlight region (region to which a single backlight emits light is referred to as "Backlight region"), and every N/2 signals Rj, Gj, Bj (j=1, 2, . . . , N/2) are assigned to each of the output signal generation sections 51a and 51b. Processes carried out by the output signal generation sections 51a and 51b, the liquid crystal panel control sections 52a and 52b, and the backlight control sections 53a and 53b are respectively the same as processes carried out by the output signal generation section 11, the liquid crystal panel control section 12, and the backlight control section 14. Thus, driving can be carried out with the liquid crystal panel 53 and the backlight 55 divided into regions.

Further, FIG. 10(b) illustrates an example where the output signal generation section 51, the liquid crystal panel control section 52, and the backlight control section 54 are shared by plural backlights.

In this arrangement, as in the aforementioned arrangement, the input signal division section 57 divides an inputted signal of a single image into signals each of which corresponding to each backlight region. Since means at the following stage, e.g., the output signal generation section 51 is shared by the plural backlights, the input image signal is stored in the memory 57 once and only a signal, corresponding to the backlight region, which should be processed is sent to the output signal generation section 51. As to the backlight control signal outputted from the backlight control section 54, a backlight which is to be controlled by the backlight control signal is selected from plural backlights in accordance with a backlight selection signal (not shown).

A general image has such a characteristic that similar colors sequentially appear in a vicinity region. Thus, as in the arrangements illustrated by FIG. 10(a) and FIG. 10(b), a backlight in a backlight region made up of dark pixels can be made darker by dividing the backlight region. As a result, the division of the backlight allows the entire backlight power consumption to be more greatly reduced than the case where the backlight is not divided.

Embodiment 2

In Embodiment 1, the luminance Wi incorporated into the W sub pixel in the target pixel is max (Ri, Gi, Bi)/2 in case where min (Ri, Gi, Bi)≧max (Ri, Gi, Bi)/2. Further, in case where min (Ri, Gi, Bi)<max (Ri, Gi, Bi)/2, the luminance Wi is min (Ri, Gi, Bi). As a result, in Embodiment 1, the optimal W sub pixel luminance value Wi in the target pixel Wi is calculated as follows.

$$Wi=\min(\max(Ri,Gi,Bi)/2,\min(Ri,Gi,Bi))$$

However, in Embodiment 1, the W sub pixel luminance Wi calculated by the foregoing expression is optimal strictly only in case where a white luminance property of the RGB sub pixels is equal to a white luminance property of the W sub pixel. Herein, the condition under which a white luminance property of the RGB sub pixels is equal to a white luminance property of the W sub pixel means a condition under which a display luminance P1 in case where a transmittance of each of the RGB sub pixels is x % and a transmittance of the W sub pixel is 0% is equal to a display luminance P2 in case where a transmittance of each of the RGB sub pixels is 0% and a transmittance of the W sub pixel is x %.

If a ratio of the display luminance P1 and the display luminance P2 is defined as WR (=P2/P1), WR is equal to 1 in case where the white luminance property of the RGB sub pixels and the white luminance property of the W sub pixel are equal to each other. However, in the liquid crystal panel, a color Filter used for the RGB sub pixels does not completely transmit light whose wavelength is suitable for transmission in the color filter, and the color filter absorbs the light to some extent. Thus, even if area sizes of the RGBW sub pixels are equal to one another, it is often that WK>1 in an actual use. Further, an area size of the W sub pixel may be made larger than an area size of each of the RGB sub pixels so that WK>1.

Embodiment 2 proposes a method for calculating an optimal backlight luminance value in case where WR>1.

First, a relation between pixel data of a target pixel in case where WR>1 and an optimal backlight luminance value for the pixel data is described as follows with reference to FIG. 13(a) and FIG. 13(b). Note that, as in the pixel data used in FIG. 3(a) and FIG. 3(b), the pixel data used in FIG. 13(a) and FIG. 13(b) is (Ri, Gi, Bi)=(50, 60, 40) for example.

FIG. 13(a) illustrates a state in which input RGB values are divided into RGBW values on the basis of the technique of Embodiment 1 (hereinafter, "first technique") so as to set LCD transmittances and backlight values in case where WR=2.

In this case, min (Ri, Gi, Bi)≧max (Ri, Gi, Bi)/2, so that a value corresponding to max (Ri, Gi, Bi) is incorporated into a luminance value of the W component. As a result, input signals (Ri, Gi, Bi)=(50, 60, 40) indicated by the RGB signals are converted into signals (Rqi, Gqi, Bqi, Wqi)=(20, 30, 10, 30) indicated by the RGBW signals. Further, in the target pixel, the backlight luminance value is set so that max (Rqi, Gqi, Bqi, Wqi)=30.

Transmittances of the R, G, B, and W sub pixels are respectively determined in accordance with the backlight luminance value. Specifically, each of transmittances of the R, G, and B sub pixels is determined on the basis of such calculation that (output luminance value)/(backlight luminance value). That is, the transmittances of the R, G, and B are respectively set to 67% (=20/30), 100% (=30/30), 33% (=10/30).

While, a transmittance of the W sub pixel can not be determined merely on the basis of such calculation that (output luminance value)/(backlight luminance value) in case where WR is not equal to 1. For example, in case where WR=2 as in the present example, a luminance increased by incorporating the luminance value into the W component becomes twice as high as a luminance decreased by subtracting the luminance value from the RGB components (in case where WR=2), so that the luminance greatly varies. In order to prevent such luminance variation, it is necessary to divide the transmittance of the W sub pixel by a value of WR, so that the transmittance of the W sub pixel in the example illustrated in FIG. 13(a) is 50% (=30/(30×2)) on the basis of such calculation that (output luminance value)/((backlight luminance value)×WR).

As a result, in the example illustrated in FIG. 13(a), the final backlight value is 30, and the transmittances of the R, G, B, and W sub pixels are respectively set to 67%, 100%, 33%, and 50%. Comparison with the example illustrated in FIG. 3(a) shows that the backlight values are the same but the transmittances of the W sub pixels are different from each other.

In the example illustrated in FIG. 3(a), the transmittance of the W sub pixel is 100%, so that the luminance values of the RGB sub pixels cannot be further incorporated into the W sub pixel. Also the backlight value 30 is a minimum value which cannot be further decreased. While, in the example illustrated in FIG. 13(a), the transmittance of the W sub pixel is 50%, and none of the luminance values of the KGB sub pixels are 0, so that the W sub pixel has a room which allows the luminance values of the RGB sub pixels to be further incorporated therein. Thus, in the example illustrated in FIG. 13(a), the backlight value 30 is not a minimum value which cannot be further decreased.

FIG. 13(b) illustrates a state in which input RGB values are divided into RGBW values on the basis of the technique of Embodiment 2 (hereinafter, "second technique") so as to set LCD transmittances and backlight values in case where WR=2.

In the second technique, incorporation of part of the RGB components into the W component is based on the value of WR.

In the first technique, how to calculate the backlight luminance value with respect to the target pixel varies depending on whether such relation that min (Ri, Gi, Bi)≧max (Ri, Gi, Bi)/2 is satisfied or not. On the other hand, in the second technique, how to calculate the backlight luminance value with respect to the target pixel varies depending on whether such relation that min (Ri, Gi, Bi)≧max (Ri, Gi, Bi)/(1+1/WR) is satisfied or not.

In an example illustrated in FIG. 13(b), such relation that min (Ri, Gi, Bi)≧max (Ri, Gi, Bi)/(1+1/WR) is satisfied. In this case, a value corresponding to max (Ri, Gi, Bi)/(1+1/WR) is incorporated from the RGB components into the W component. As a result, the input signals (Ri, Gi, Bi)=(50, 60, 40) indicated by the RGB signals are converted into signals (Rqi, Gqi, Bqi, Wqi)=(10, 20, 0, 40) indicated by the RGBW signals. Further, in the target pixel, the luminance value of the backlight is set to such a value that max (Rqi, Gqi, Bqi, Wqi/WR), i.e., 20. Note that, in this case, a value of Wqi/WR is equal to a value of max (Rqi, Gqi, Bqi), so that the luminance value of the backlight may be calculated as the value of max (Rqi, Gqi, Bqi) or as the value of Wqi/WR.

Each of transmittances of the R, G, and B sub pixels are determined in accordance with such calculation that (output luminance value)/(backlight luminance value). That is, the transmittances of the R, G, and B sub pixels are respectively set to 50% (=10/20), 100% (=20/20), and 0% (=0/20).

While, as to the transmittance of the W sub pixel, a luminance value indicated by data is 40 but the backlight luminance is 20. However, in case where WR is not equal to 1, when each of display luminances of the RGB sub pixels is expressed by (backlight luminance value)×(sub pixel transmittance), a display luminance of the W sub pixel is expressed by (backlight luminance value)×(sub pixel transmittance)×WR. Thus, also in this case, when the transmittance of the W sub pixel is 100% even though the backlight value is 20, it is possible to obtain a display luminance corresponding to a white display luminance 40 at the RGB sub pixels. That is, the transmittance of the W sub pixel is determined in accordance with such calculation that (output luminance value)/((backlight luminance value)×WR).

As a result, in the example illustrated in FIG. 13(b) the final backlight value is 20, and transmittances of the R, G, B, and W sub pixels are respectively set to 50%, 1.00%, 0%, and 100%. Comparison with the example illustrated in FIG. 13(a) shows the backlight value is decreased from 30 to 20. Further, the transmittance of the W sub pixel is 100%, so that the luminance values of the RGB sub pixels cannot be further incorporated into the W sub pixel. This shows that the backlight value 20 is a minimum (optimal) value which cannot be further decreased.

Figure 14:
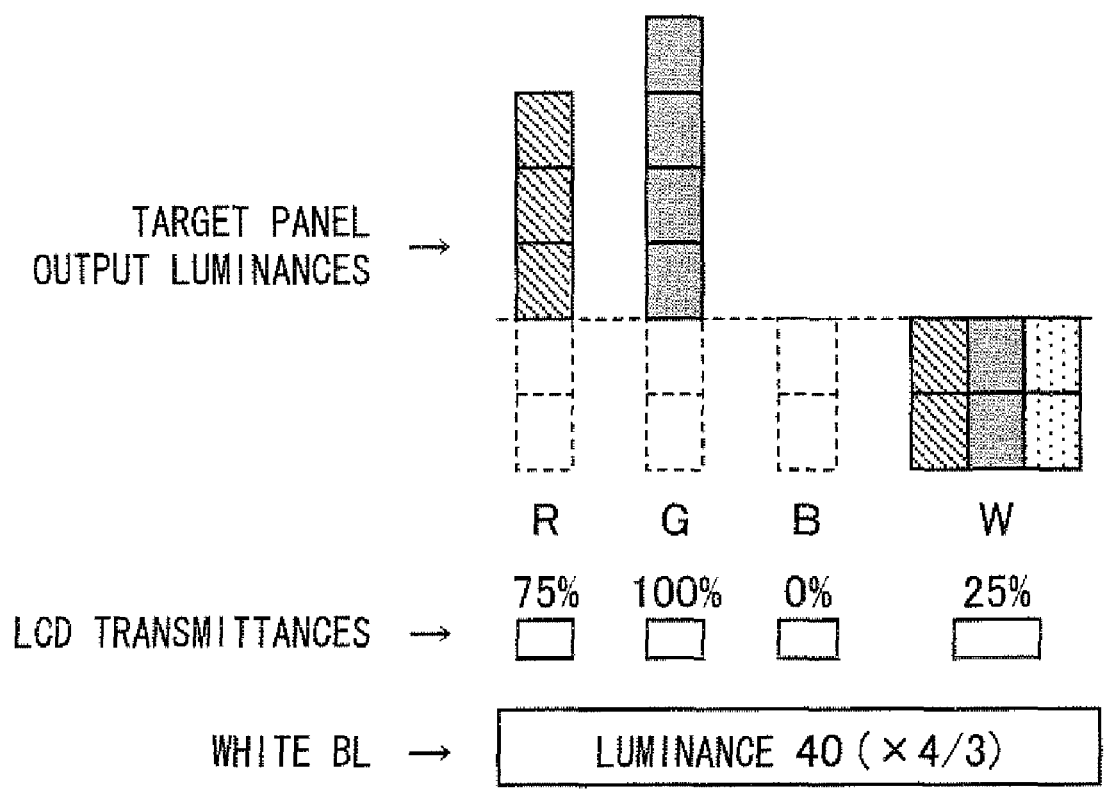
FIG. 14 is a drawing illustrating how to calculate the backlight luminance value in accordance with the second technique.

FIG. 13(b) illustrates the case where min (Ri, Gi, Bi)≧max (Ri, Gi, Bi)/(1+1/WR) is satisfied. With reference to FIG. 14, the following describes how to carry out calculation in case where the foregoing condition is not satisfied (min (Ri, Gi, Bi)<max (Ri, Gi, Bi)/(1+1/WR) is satisfied). FIG. 14 illustrates such target pixel data that (Ri, Gi, Bi)=(50, 60, 20) for example.

In the example illustrated in FIG. 14, min (Ri, Gi, Bi)≦max (Ri, Gi, Bi)/(1+1/WR) is satisfied. In this case, a value corresponding to min (Ri, Gi, Bi) is incorporated from the RGB components into a luminance value of the W component. As a result, input signals (Ri, Gi, Bi)=(50, 60, 20) indicated by the KGB signals are converted into signals (Rqi, Gqi, Bqi, Wqi)=(30, 40, 0, 20). Further, in the target pixel, the luminance value of the backlight is set to such a value that max (Rqi, Gqi, Bqi, Wqi/WR), i.e., 40. Note that, in this case, a value of Wqi/WR does not exceed a value of max (Rqi, Gqi, Bqi), so that the luminance value of the backlight may be calculated as a value of max (Rqi, Gqi, Bqi).

Bach of transmittances of the R, G, and B sub pixels is determined in accordance with such calculation that (output luminance value)/(backlight luminance value). That is, the transmittances of the R, G, and B sub pixels are respectively set to 75% (=30/40), 100% (=40/40), and 0% (=0/40).

While, the transmittance of the W sub pixel is determined in accordance with such calculation that (output luminance value)/((backlight luminance value)×WR). That is, the transmittance of the W sub pixel is set to 25% (=20/(40×2)).

In this way, according to the second technique of Embodiment 2, the W sub pixel luminance value Wi in the target pixel is calculated as follows.

$Wi=\min(\max(Ri,Gi,Bi)/(1+1/WR),\min(Ri,Gi,Bi))$

The power consumption in the target pixel is reduced as much as possible by carrying out the following process. In case where a maximum transmission quantity on the RGB side is 1, a transmission quantity on the W side is multiplied by WR, thereby minimizing the backlight value. Thus, it is preferable to calculate the Wi quantity, which should be loaded on the W side, in accordance with the value of WR as described above.

With FIG. 13 and FIG. 14, how to calculate the optimal backlight luminance value with respect to a single target pixel was described above. However, in the present liquid crystal display device, a single backlight is provided so as to correspond to a plurality of pixels. Thus, actually, bare minimum backlight values of all pixels in a display region corresponding to the backlight are calculated, and a maximum value of the thus calculated plural backlight luminance values is set as a luminance value of the backlight. This is the same as in Embodiment 1.

With reference to FIG. 15(a) to FIG. 15(e), the following describes a procedure for determining the backlight luminance value and the sub pixel transmittances of the present liquid crystal display device in accordance with the second technique. Note that, in FIG. 15(a) to FIG. 15(e), WR is equal to 2.

FIG. 15(a) illustrates input signals (Ri, Gi, Bi) of a display region corresponding to a certain backlight. Herein, in order to simplify explanation, it is assumed that the display region is constituted of four pixels A to D.

As to each of the pixels A to D, input signals (Ri, Gi, Bi) are converted into output signals (Rqi, Gqi, Gqi, Wqi) indicated by the RGBW signals. This results are as illustrated in FIG. 15(b). Further, backlight luminance values calculated for respective pixels are as illustrated in FIG. 15(c). As a result, the backlight luminance value is set to a maximum value of the thus calculated plural backlight luminance values, i.e., 80.

Further, the backlight luminance value may be calculated by the following expression.

Backlight luminance value=max($Rq1,Gq1,Bq1, Wq1/WR, \ldots ,RqN,GqN,BqN,WqN/WR$)

From the results illustrated in FIG. 15(b), the backlight luminance value 80 is calculated also by the foregoing expression.

With respect to the thus calculated backlight luminance value 80, transmittances (Rpi, Gpi, Bpi, Wpi) of the pixels are calculated in accordance with the output signals (Rqi, Gqi, Bqi, Wqi) illustrated in FIG. 15(b), and results thereof are as illustrated in FIG. 15(d). Further, the final display luminances of the pixels are as illustrated in FIG. 15(e). This shows that the display luminances are identical to the luminance values of the input signals (Ri, Gi, Bi) illustrated in FIG. 15(a).

In the present liquid crystal display device adopting the second technique, the backlight luminance value and the sub pixel transmittances are determined by the output signal generation section 11. The output signal generation section 11 may be arranged in the same manner as in FIG. 6 or FIG. 7 of Embodiment 1. The following describes an example of an arrangement corresponding to the arrangement illustrated in FIG. 6.

Input signals (Ri, Gi, Bi) inputted to the output signal generation section 11 are first inputted to the transmission quantity calculation section 21. The transmission quantity calculation section 21 calculates transmission quantities Rqi, Gqi, Bqi, and Wqi of the sub pixels in accordance with the input signals (Ri, Gi, Bi). In other words, RGB signals are converted into RGBW signals for each pixel. The conversion process is carried out by the method illustrated in FIG. 13(b) or the method illustrated in FIG. 14.

The RGBW signals (Rqi, Gqi, Bqi, Wqi) calculated by the transmission quantity calculation section 21 are sent to the backlight value calculation section 22 and the memory 23. The backlight value calculation section 22 calculates the backlight value b1 in accordance with the RGBW signals (Rqi, Gqi, Bqi, Wqi). That is, the backlight value calculation section 22 determines a maximum value of transmission quantities of all the sub pixels of all the pixels (N number of pixels) in a single image as the backlight value b1. Further, the memory 23 allows the sent RGBW signals (Rqi, Gqi, Bqi, Wqi) to be stored therein without any modification.

The transmittance calculation section 24 calculates transmittances (Rpi, Gpi, Bpi, Wpi) of the sub pixels in accordance with the backlight value b1 calculated by the backlight value calculation section 22 and the RGBW signals (Rqi, Gqi, Bqi, Wqi) stored in the memory 23. In this case, the transmittances Rpi, Gpi, Bpi, and Wpi are calculated by the following expressions respectively. Herein, the transmittance Wpi of the W sub pixel is calculated in a manner different from Embodiment 1.

$Rpi=Rqi/b1$ $Gpi=Gqi/b1$ $Bpi=Bqi/b1$ $Wpi=Wqi/(b1 \times WR)$

Next, the transmission quantity calculation section 21 adopting the second technique may be arranged in the same manner as in the arrangement illustrated in FIG. 8 as Embodiment 1 adopting the first technique. However, the white transmission quantity calculation section 31 carries out calculation in a manner slightly different from the case of the first technique.

Figure 16:
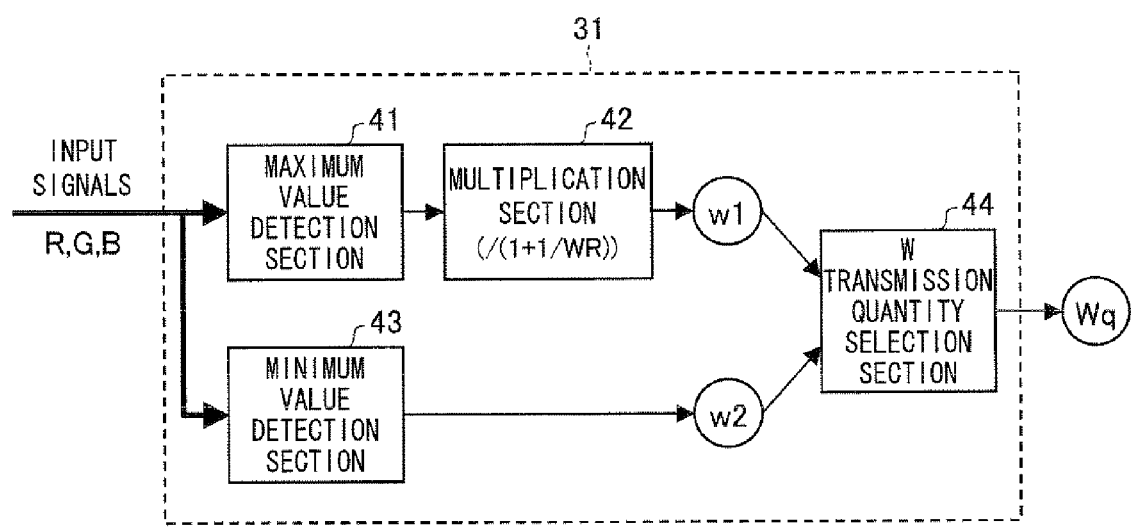
FIG. 16 is a block diagram illustrating an example of an arrangement of a white transmission quantity calculation section of the transmission quantity calculation section.

FIG. 16 illustrates an arrangement of the white transmission quantity calculation section 31 adopting the second technique. In the arrangement of FIG. 16, the white transmission quantity calculation section 31 includes a maximum value detection section 41, a multiplication section 42, a minimum value detection section 43, and a W transmission quantity selection section 44.

The maximum value detection section 41 and the multiplication section 45 are arranged so as to calculate a first W transmission quantity w1 in accordance with the method illustrated in FIG. 13(b). That is, the first W transmission quantity w1 is calculated by causing the maximum value detection section 41 to detect the maximum value from the input signals RGB and by causing the multiplication section 42 to divide the maximum value by (1+1/WR) (that is, to multiply the maximum value by 1/(1+1/WR)).

Further, the minimum value detection section 43 is arranged so as to calculate a second W transmission quantity w2 in accordance with the method illustrated in FIG. 14. That is, the second W transmission quantity w2 is calculated by causing the minimum value detection section 43 to detect a minimum value from the input signals RGB.

The first W transmission quantity w1 and the second W transmission quantity w2 having been calculated in this manner are inputted to the W transmission quantity selection section 44, and the W transmission quantity selection section 44 selects a smaller one from the first W transmission quantity w1 and the second W transmission quantity w2 as the W transmission quantity Wq.

In this way, according to the arrangement of FIG. 16, both the first W transmission quantity w1 and the second W transmission quantity w2 are calculated with respect to all the pixels, and a smaller one of the first W transmission quantity w1 and the second W transmission quantity w2 is determined as the W transmission quantity Wq. In case of this arrangement, in such a pixel that min (Ri, Gi, Bi)$\geq$max (Ri, Gi, Bi)/(1+1/WR), the first W transmission quantity w1 is selected as the W transmission quantity Wq. Further, in such a pixel that min (Ri, Gi, Bi)$\leq$max (Ri, Gi, Bi)/(1+1/WR), the second W transmission quantity w2 is selected as the W transmission quantity Wq.

Also in the process of the output signal generation section 11 of Embodiment 2 adopting the second technique, it is possible to realize the foregoing arrangement with software as in Embodiment 1.

Further, the second technique is of course applicable also to the arrangement in which the display screen of the liquid crystal panel 13 is divided into plural regions and a plurality of backlights are provided so that backlight luminances for the regions can be respectively adjusted.

The aforementioned functions of the respective sections are realized by a program. In the present embodiment, the program is stored in a computer-readable storage medium.

In the present embodiment, a memory required for a computer to execute processes, e.g., RAM may be a program medium used as the storage medium. Alternatively, the storage medium may be provided on an external storage device of the computer in a detachable manner so that a program stored in the storage medium can be read via the external storage device. Examples of the external storage device include a magnetic tape device, an FD driving device, a CD-ROM driving device, and the like (all of which are not shown). Examples of the storage medium include a magnetic tape, an FD, a CD-ROM, and the like (all of which are not shown). In any case, it may be so arranged that a CPU 12 accesses the program stored in each storage medium to execute the program. Alternatively, in any case, it may be so arranged that: the program is read from the storage medium and loaded to a predetermined program storage area, e.g., a program storage area of RAM, and the loaded program is read and executed by CPU. A program for the load is stored in the computer in advance.

Herein, the storage medium is arranged so as to be detachable from a main body of the computer. As the storage medium, a medium which holds the program in a fixed manner is applicable. Specific examples of the storage medium include: tapes, such as magnetic tape and cassette tape; disks including magnetic disks, such as floppy disks (registered trademark) and hard disk, and optical disks, such as CD-ROMs, magnetic optical disks (MOs), mini disks (MDs), and digital versatile disks (DVDs); cards, such as IC card (including memory cards) and optical cards; and semiconductor memories, such as mask ROMs, erasable and programmable ROMs (EPROMs), electrically EPROMs (EEPROMs), and flash ROMs. Further, it may be so arranged that the storage medium contains the program in a flowing manner like downloading the program over the communications network. Note that, to download the program over the communications network, the program for download may be stored in the main body of the computer in advance or installed from another storage medium into the main body of the computer.

Note that, the content stored in the storage medium is not limited to the program, and the content may be data.

Further, the foregoing embodiments described the case where the present invention is applied to the liquid crystal display, but the present invention is applicable also to general transmission displays by the same techniques.

Overview of the Embodiment

As described above, a transmission liquid crystal display device according to the present embodiment includes: a liquid crystal panel 13 having pixels each of which is divided into four sub pixels as red (R), green (G), blue (B), and white (W) sub pixels; and a backlight 15 which is capable of controlling its emission luminance.

According to the arrangement, by using the liquid crystal panel 13 having pixels each of which is divided into four sub pixels as R, G, B, and W sub pixels, it is possible to incorporate parts of R, G, and B components the W sub pixel which has no (or little) light loss caused by absorption of a filter. As a result, the color filter less absorbs light, so that it is possible to reduce power consumption in the transmission liquid crystal display device.

Note that, the liquid crystal panel 13 having pixels each of which is divided into four sub pixels has a lower display luminance in such a pixel that the W sub pixel hardly allows light to be incorporated therein. Thus, in case where this arrangement is combined with an ordinary backlight whose emission luminance cannot be controlled, it is impossible to effectively reduce power consumption. However, it is possible to reduce power consumption of the backlight 15 by combining the arrangement with the backlight 15.

Further, it is possible to arrange the transmission liquid crystal display device so as to include: an output signal generation section 11 for generating transmittance signals of the R, G, B, and W sub pixels of each of the pixels of the liquid crystal panel in accordance with input signals which are RGB signals and for obtaining a backlight value of the backlight 15; a liquid crystal panel control section 12 for controlling driving of the liquid crystal panel 13 in accordance with the transmittance signals generated by the output signal generation section 11; and a backlight control section 14 for controlling the emission luminance of the backlight 15 in accordance with the backlight value obtained by the output signal generation section 11.

According to the arrangement, also in case where the input signals are the RGB signals, it is possible to drive the liquid crystal panel having pixels, each of which is divided into four sub pixels as R, G, B, and W sub pixels, in accordance with the transmittance signals generated by the output signal generation section 11.

Further, it is possible to arrange the transmission liquid crystal display device so that the output signal generation section 11 includes: a transmission quantity calculation section 21 for obtaining transmission quantities of the R, G, B, and W sub pixels of the pixel in accordance with the input signals inputted to the pixel; a backlight value calculation section 22 for obtaining the backlight value, which is the emission luminance of the backlight 15, in accordance with transmission quantities of sub pixels of all pixels positioned in a display region corresponding to the backlight 15; and a transmittance calculation section 24 for obtaining transmittances of the sub pixels in accordance with the backlight value obtained by the backlight value calculation section 22 and the transmission quantities of the sub pixels obtained by the transmission quantity calculation section 21.

Further, it is possible to arrange the transmission liquid crystal display device so as to include: an output signal generation section 11 for generating transmittance signals of the R, G, B, and W sub pixels of each of the pixels of the liquid crystal panel in accordance with (a) input signals which are RGB signals and (b) WK and for obtaining a backlight value of the backlight 15 when WR>1, where WR is P2/P1 indicative of a ratio between (i) a display luminance P1 in case where each of the transmittances of the RGB sub pixels is x % and a transmittance of the W sub pixel is 0% and (ii) a display luminance P2 in case where each of the transmittances of the RGB sub pixels is 0% and the transmittance of the W sub pixel is x %; a liquid crystal panel control section 12 for controlling driving of the liquid crystal panel 13 in accordance with the transmittance signals generated by the output signal generation section 11; and a backlight control section 14 for controlling the emission luminance of the backlight 15 in accordance with the backlight value obtained by the output signal generation section 11.

Further, it is possible to arrange the transmission liquid crystal display device so that the output signal generation section 11 includes: a transmission quantity calculation section 21 for obtaining transmission quantities of the R, G; B, and W sub pixels of the pixel in accordance with the input signals inputted to the pixel and the WR; a backlight value calculation section 22 for obtaining the backlight value, which is the emission luminance of the backlight 15, in accordance with transmission quantities of sub pixels of all pixels positioned in a display region corresponding to the backlight 15; and a transmittance calculation section 24 for obtaining transmittances of the sub pixels in accordance with (I) the backlight value obtained by the backlight value calculation section 22, (II) the transmission quantities of the sub pixels obtained by the transmission quantity calculation section 2, and (III) the WR.

According to the arrangement, also in case where the input signals are the RGB signals, it is possible to drive the liquid crystal panel 13, having pixels each of which is divided into four sub pixels as R, G, B, and W sub pixels, in accordance with the transmittance signals generated by the output signal generation section 11. Further, when WR>1, an optimal backlight value can be calculated.

Further, it is possible to arrange the transmission liquid crystal display device so that the transmission quantity calculation section 21 determines a minimum value, out of R, G, and B components of the input signals of each of the pixels, as the transmission quantity of the W sub pixel in the pixel.

According to the arrangement, the transmission quantity of the W sub pixel does not exceed a minimum value out of values of the R, G, and B components of the input signals. Thus, the input signals KGB can be converted into the RGBW signals without changing components thereof.

Further, it is possible to arrange the transmission liquid crystal display device so that the transmission quantity calculation section 21 multiplies a maximum value, out of R, G, and B components of the input signals of each of the pixels, by ½ so as to determine a value obtained by the multiplication as the transmission quantity of the W sub pixel in the pixel.

According to the arrangement, in a color having a maximum value out of the R, G, and B components, a transmission quantity of the corresponding sub pixel and a transmission quantity of the W sub pixel are equal to each other. That is, two sub pixels can transmit light of the backlight 15, so that power of the backlight 15 can be used most efficiently.

Further, it is possible to arrange the transmission liquid crystal display device so that the transmission quantity calculation section 21 determines a minimum value, out of R, G, and B components of the input signals of each of the pixels, as a first transmission quantity, and the transmission quantity calculation section 21 multiplies a maximum value, out of R, G, and B components of the input signals of each of the pixels, by ½ so as to determine a value obtained by the multiplication as a second transmission quantity, and the transmission quantity calculation section 21 determines a smaller one of the first and second transmission quantities as the transmission quantity of the W sub pixel in the pixel.

Further, it is possible to arrange the transmission liquid crystal display device so that the transmission quantity calculation section 21 obtains a transmission quantity Wq of the W sub pixel in each of the pixels by determining, as the transmission quantity of the W sub pixel, a smaller one of (a) a minimum value out of R, G, and B components of the input signals of each of the pixels and (b) a value obtained by dividing a maximum value out of R, G, and B components of the input signals of the pixel by (1+1/WR).

According to the arrangement, the input signals RGB can be converted into the RGBW signals without changing components thereof and power of the backlight can be efficiently used.

Further, it is possible to arrange the transmission liquid crystal display device so that the transmission quantity calculation section 21 subtracts the transmission quantity of the W sub pixel from the R, G, and B components of the input signals of each of the pixels so as to determine transmission quantities of the R, G, and B sub pixels in the pixel.

Further, it is possible to arrange the transmission liquid crystal display device so that the transmittance calculation section 24 divides each of the transmission quantities of the R, G, and B sub pixels, which have been obtained by the transmission quantity calculation section 21, by the backlight value obtained by the backlight value calculation section 22, so as to determine a value obtained by the division as each of the transmittances of the R, G, and B sub pixels, and the transmittance calculation section 24 divides the transmission quantity of the W sub pixel, which has been obtained by the transmission quantity calculation section 21, by a product of the backlight value obtained by the backlight calculation section 22 and WR, so as to determine a value obtained by the division as the transmittance of the W sub pixel.

Further, it is possible to arrange the transmission liquid crystal display device so that the backlight calculation section 22 obtains the backlight value Wb1 by the following expression $$Wb1=\max(Rq1,Gq1,Bq1,Wq1,/WR,\ldots,RqN,GqN,BqN,WqN/WR)$$

where N represents the number of all pixels positioned in a display region corresponding to the backlight 15, and transmission quantities of a target pixel positioned in the display region are (Rqi, Gqi, Bqi, Wqi) (i=1, 2, ..., N).

Further, it is possible to arrange the transmission liquid crystal display device so as to include a plurality of backlights 55 so as to correspond to the liquid crystal panel 53, wherein a transmittance of the liquid crystal panel 53 and an emission luminance of each of the backlights 55 are controlled for each region corresponding to the backlights 55.

According to the arrangement, by dividing the backlight 55, it is possible to optimally set the backlight value for each backlight region, so that it is possible to reduce entire power consumption of the backlight.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A transmission liquid crystal display device, comprising:
a liquid crystal panel having pixels each of which is divided into four sub pixels as red (R), green (G), blue (B), and white (W) sub pixels;
a white active backlight which is capable of controlling its emission luminance;
an output signal generation section for generating transmittance signals of the R, G, B, and W sub pixels of each of the pixels of the liquid crystal panel in accordance with (a) input signals which are RGB signals and (b) WR and for obtaining a backlight value of the white active backlight when WR>1, where WR is P2/P1 indicative of a ratio between (i) a display luminance P1 in case where each of the transmittances of the RGB sub pixels is x % and a transmittance of the W sub pixel is 0% and (ii) a display luminance P2 in case where each of the transmittances of the RGB sub pixels is 0% and the transmittance of the W sub pixel is x %;
a liquid crystal panel control section for controlling driving of the liquid crystal panel in accordance with the transmittance signals generated by the output signal generation section; and
a backlight control section for controlling the emission luminance of the white active backlight in accordance with the backlight value obtained by the output signal generation section
wherein the output signal generation section includes: a transmission quantity calculation section for obtaining transmission quantities of the R, G, B, and W sub pixels of the pixel in accordance with the input signals inputted to the pixel and the WR; a backlight value calculation section for obtaining the backlight value, which is the emission luminance of the white active backlight, in accordance with transmission quantities of sub pixels of all pixels positioned in a display region corresponding to the white active backlight; and a transmittance calculation section for obtaining transmittances of the sub pixels in accordance with (I) the backlight value obtained by the backlight value calculation section, (II) the transmission quantities of the sub pixels obtained by the transmission quantity calculation section, and (III) the WR;
wherein the transmission quantity calculation section obtains a transmission quantity Wq of the W sub pixel of each of the pixels by selecting a smaller one of (a) a minimum value out of R, G, and B components of the input signals of each of the pixels and (b) a value obtained by dividing a maximum value out of R, G, and B components of the input signals of the pixel by (1+1/WR), and
the transmission quantity calculation section subtracts the transmittance of the W sub pixel from the R, G, and B components of the input signals of the pixel so as to obtain transmission quantities Rq, Gq, and Bq of the R, G, and B sub pixels, and
the backlight calculation section obtains the backlight value Wb1 by the following expression $$Wb1=\max(Rq1,Gq1,Bq1,Wq1,/WR,\ldots,RqN,GqN,BqN,WqN/WR)$$

where N represents the number of all pixels positioned in a display region corresponding to the white active backlight, and transmission quantities of a target pixel positioned in the display region are $(Rqi, Gqi, Bqi, Wqi)(i=1, 2, \ldots, N)$.

2. The transmission liquid crystal display device as set forth in claim 1, comprising a plurality of white active backlights so as to correspond to the liquid crystal panel, wherein a transmittance of the liquid crystal panel and an emission luminance of each of the white active backlights are controlled for each region corresponding to the white active backlight.

3. A computer-readable storage medium, storing a control program which causes a computer to function as the output signal generation section, the liquid crystal panel control section, the backlight control section, the transmission quantity calculation section, the backlight value calculation section, and the transmittance calculation section of the transmission liquid crystal display device as set forth in claim 1.

* * * * *